(12) United States Patent
Gattu et al.

(10) Patent No.: US 11,268,896 B2
(45) Date of Patent: Mar. 8, 2022

(54) ELECTROCHEMICAL CORROSION UNDER CONTROLLED REDOX CONDITIONS

(71) Applicant: UCHICAGO ARGONNE, LLC, Chicago, IL (US)

(72) Inventors: Vineeth Kumar Gattu, Chicago, IL (US); William L. Ebert, Batavia, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 202 days.

(21) Appl. No.: 16/353,695

(22) Filed: Mar. 14, 2019

(65) Prior Publication Data
US 2020/0292441 A1    Sep. 17, 2020

(51) Int. Cl.
| | |
|---|---|
| *G01N 17/02* | (2006.01) |
| *C23F 13/04* | (2006.01) |
| *G01N 17/00* | (2006.01) |
| *G01N 27/02* | (2006.01) |
| *G21F 5/12* | (2006.01) |

(52) U.S. Cl.
CPC ............ *G01N 17/02* (2013.01); *C23F 13/04* (2013.01); *G01N 17/006* (2013.01); *G01N 27/026* (2013.01); *G21F 5/125* (2019.01)

(58) Field of Classification Search
None
See application file for complete search history.

(56) References Cited

U.S. PATENT DOCUMENTS 9,039,764 B2    5/2015    Gilbert

OTHER PUBLICATIONS

Vineeth Kumar Gattu, Role of Alloying Elements in the Electrochemical Corrosion Behavior of Multiphase Alloys, University of Illinois, Chicago, 295 pgs. (Year: 2017).*
J.E. Indacochea, Performance of a Steel/Oxide Composite Waste Form for Combined Waste Streams from Advanced Electrochemical Processes, U.S. Department of Energy, Jun. 15, 2017.

* cited by examiner

Primary Examiner — J. Christopher Ball
(74) Attorney, Agent, or Firm — Cherskov Flaynk & Gurda, LLC

(57) ABSTRACT

A method for predicting corrosion rates of a material during service conditions is provided, the method having the steps of determining a first phase composition of the material; exposing the material to service conditions chemical environment; applying an electrical potential to the exposed material to represent the solution redox; identifying ranges of the applied potential that correspond to different corrosion behaviors of the material; quantifying current and surface electrical properties during corrosion; and determining a second phase composition of the material to identify corroded phases. Also provided is a method for determining radionuclide source terms, the method having the steps of supplying a multiphase metallic waste containing the radionuclides; immersing the waste in a solution representing repository chemistry conditions; and oxidizing the immersed waste for a period of time and at particular imposed voltages representing solution redox values to establish a steady current representing corrosion rate of the waste.

9 Claims, 18 Drawing Sheets

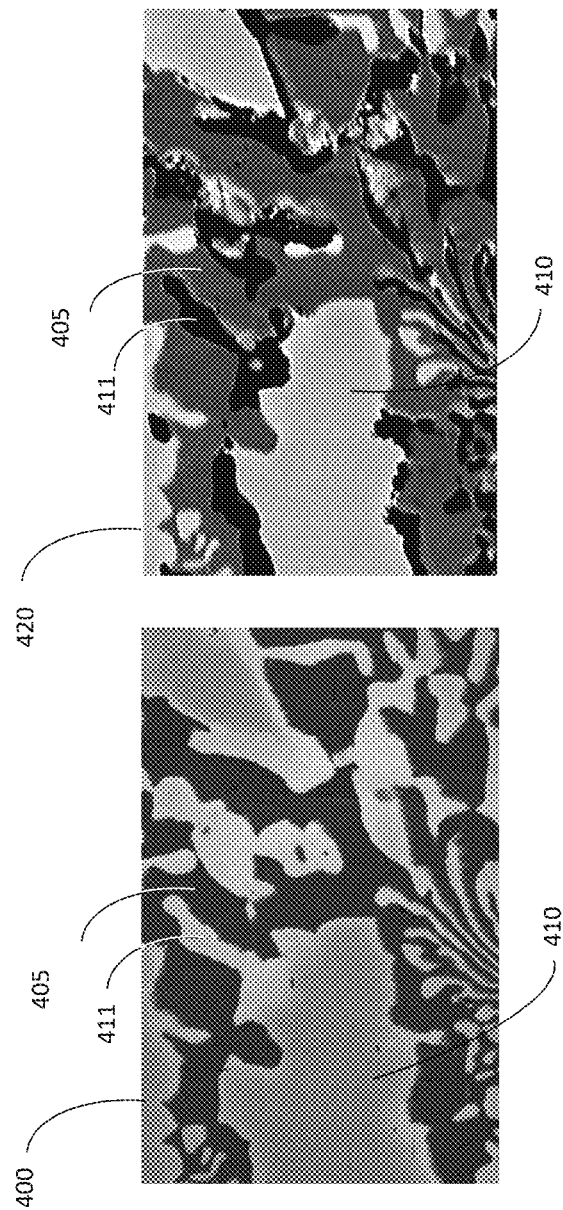

ELECTROCHEMICAL CORROSION UNDER CONTROLLED REDOX CONDITIONS

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to a method for determining corrosion behavior in metals and more specifically, the invention provides an experimental method and model based on electrode-kinetics theory that can be used for predicting corrosion rates and lifecycle characteristics of metals and alloys including the release of constituent elements into a contacting fluid (e.g., in the body or environment).

2. Background of the Invention

Medical implants, building structures, pipe lines, waste forms, and other industries incorporate various metals into their products. These metals require a particular set of characteristics to adequately perform their intended use. As such, relevant metals and their corrosion characteristics continue to be researched.

Medical implants need to function for decades in rapidly changing biochemical conditions (e.g., blood plasma pH and medication levels). For example, the corrosion of alloys, which comprise implanted medical devices used in biological environments, release contaminants that could be hazardous or desirable, depending on their release rates. These material corrosion and constituent release rates will depend on the alloy composition and microstructure and the environmental (i.e., in vivo) conditions.

Construction metals and pipelines are subjected to mechanical stress (e.g. elastic, deformable), environmental stress (e.g., acid rain, oxidation), and other chemical insults. For example, pipelines are widely used to carry natural gas, oil, water, and sewerage. The alloys used for pipelines are susceptible to corrosion when placed underground and subsequently exposed to seawater, salts, ground shifts, etc. Corrosion can deteriorate the mechanical properties and cause failure of the pipelines leading to the release of hazardous materials into the fluid being transferred or the surrounding environment.

Corrosion of military equipment and infrastructure under the U.S., Department of Defense costs about $20B annually. A wide range of single and multiphase materials are used in various and changing service conditions. The use of standard electrochemical tests to predict their failure is not reliable because they do not represent the corrosion conditions. Long-term performance depends on the mechanistic understanding of the corrosion behavior of the constituent phases present on and below the materials' surface and test methods that quantify the rates of the controlling processes.

Corrosion assessment techniques are widely applied for materials used in the automotive industry. However, for enhanced performance, new lightweight materials with excellent corrosion resistance are required. Their performance directly depends on the environment, microstructure, and phase composition.

3D printed materials are increasingly used in various applications as biomaterials, automotive, medical, nuclear etc. There are insufficient standards for evaluating the corrosion and mechanical properties of these materials.

Finally, many types of wastes and their containers comprise metal. For example, one type of waste form includes radioactive spent fuel waste alloyed with shredded metal cladding. These waste forms must resist corrosion for many hundred thousand years after burial.

Coatings deposited by techniques such as atomic layer deposition, plasma spray, chemical and physical vapor deposition, high velocity oxygen fuel, and laser cladding are used to provide corrosion protection in high temperature, chemically aggressive, and high tribological wear environments. The performance of these coated materials needs to be evaluated reliably.

Key aspects of waste form development include (1) the capacity to accommodate waste constituents in durable phases, (2) reliable production methods that generate waste form products having consistent properties, and (3) confidence that the waste forms will meet regulatory requirements for radionuclide containment during handling, storage, transport, and permanent disposal. The major performance requirement for metal waste forms is to maintain sufficient corrosion resistance so that the disposal system will remain compliant with regulations as contaminants are leached or otherwise released from waste forms throughout the regulated service life of the disposal system.

The primary pathway for radionuclide release is by seepage water contacting and degrading the waste form. Subsequently, groundwater transports the released radionuclides away from the burial site and into the surrounding biosphere.

State of the art electrochemical corrosion experiments on metals measure and/or control the potential and net current of the oxidation and reduction reactions by manipulating and measuring two variables: the electrochemical redox and the pH of the solution. But these measurements fail to represent the range of the redox conditions under which the material must perform and the effects of those conditions on the material's surfaces over the long term.

Potentiodynamic scans of polished surfaces indicate regions of passive and active corrosion behavior based on changes in the measured current at various applied potentials. But the polished surfaces used in these measurements do not represent surfaces that have equilibrated under the redox and chemical conditions in the test. Also, currents measured during potentiodynamic scans do not represent the steady corrosion of a stabilized surface. Steady corrosion occurs when the net current neither increases nor decreases over time.

Most electrochemical measurements are made only at the resting-potential of the alloy in the test solution at one point in time or during very brief sampling periods. (The resting potential is the voltage/potential at which the oxidation and reduction reaction rates are equal and the net current is zero.) Every environment and material combination will have a resting potential or Ecorr that will vary as the surface passivates or is leached. It is the potential that is attained in the system (i.e., the combination of the material and the environment) in the absence of an imposed voltage, and is also referred to as the open circuit potential.

Therefore, potentiodynamic scans of polished surfaces do not represent (and cannot be extrapolated to represent) the corrosion behavior of surfaces that have stabilized at any in vivo potential over time. The method fails to take into account effects of oxides which accrue on the surface of the material and leaching (dealloying) that may occur during the service life of the material.

Reverse polarization and cyclic polarization methods are used to indicate changes in the corrosion behavior in representative solutions as pitting or passivation occurs. However, the responses represent transient behavior that may depend on the scan conditions, and may occur at the upper end of the scanned voltage range that does not represent service conditions.

The effect of cyclic polarization is to drive oxidation reactions (to higher potentials) during the anodic scan and then drive reduction reactions (to lower potentials) during the cathodic scan. Applied potential is increased or decreased with time while the current is constantly monitored. Then the process is reversed after the potential is scanned to a predetermined current density or potential and the potential is decreased with time. Measurements can be made by using one or multiple cycles. However, and as discussed supra, this method fails to generate stabilized surfaces representing those formed over long periods of time in the in vivo redox conditions in which the material must perform.

Another method, known as galvanodynamic, controls the current and measures the potential as the current is varied, plotting the change in potential versus time. This method provides the redox at which a particular corrosion process occurs, which may or may not represent in vivo redox conditions of interest.

These and other standard testing methods such as linear polarization resistance and Tafel are not conducted under service conditions and do not represent corrosion of alloy surfaces that have stabilized under service conditions. Contrarily, those methods destabilize the surface by imposing cathodic potentials at the beginning of the scan. These state of the art methods do not measure the effects of passivation or leaching on corrosion rates. Those effects must be included to characterize long-term behavior of materials under relevant service conditions c. As such, unequivocal tests to determine the suitability of certain materials for a particular industry or application over the course of a typical service life do not exist.

Coupon immersion tests are also commonly used to measure corrosion rates. But these tests only provide information regarding corrosion at the corrosion potential (Ecorr), which will drift in response to changes in both the solution composition (e.g., Eh and pH) and coupon surface properties that occur during the tests. Also, coupon immersion tests do not represent the electrochemical conditions that occur in the service environment. Rather, coupon test responses represent the cumulative corrosion occurring during the test period and only average rates can be derived, whereas most corrosion occurs (and therefore should be studied) in the early stages of most tests.

Models need to be developed to represent degradation of materials in assessments that are conducted to ensure performance requirements will be met throughout the anticipated service-life of the material, be it a medical implant venue, an oil/gas transport line, or in a waste disposal facility. Specifically, a need exists in the art for a method to assess the corrosion behavior of homogenous materials, multiphase alloys, alloy/ceramic composites, and coated materials under controlled chemical and redox conditions. The method should include the use of techniques that are consistent with the mechanistic understanding of the corrosion process and provide corrosion rates that can be related to the material, the chemical surroundings, and the phase composition at the corroding surface for modeling purposes. The method should also be sensitive to the effects of physiological or environmental variables to which the material is subjected. In buried waste scenarios, the method should relate the electrochemical corrosion behavior to the release rates of radionuclides from waste forms. For medical devices and implants, the method should represent the effects of human activity on corrosion and the release of metal particles that may be toxic. For coated materials, the method should represent and be sensitive to thermal cycling, tribology and wear conditions and should provide the corrosion rates of the coating and the underlying substrate.

SUMMARY OF INVENTION

An object of this invention is to provide a method for determining the corrosion characteristics of a material under specific controlled redox and chemical conditions that represent specific points in service environments/lives for industrial, environmental, and biological applications. It is noteworthy that the method does not average corrosion characteristics and other in-service phenomenon. Rather, the method provides a means for pinpointing corrosion status at any time during the service life of a work piece.

Another object of the present invention is to provide a method for determining corrosion characteristics of a material in changing in vivo or in situ environments. A feature of the invention is the use of electrochemical analysis on the material over an extended period of time to measure the response of the surface to the chemical and redox conditions to which the material is typically subjected. (This includes engineered facilities in geological formations related to waste disposal, industrial applications, and in the body related to medical implants). An advantage of the invention is that it enables the identification of shortcomings in proposed medical implants, construction hardware, or radioactive waste forms that can be rectified prior to permanent insertion or disposal, including multiphase and coated materials.

Yet another object of the invention is to provide a testing protocol to assess the corrosion behavior of homogenous and multiphase alloy, alloy/ceramic composite, and coated materials under controlled chemical and redox conditions. A feature of the invention is that it combines several electrochemical techniques with scanning electron microscopy (SEM) and solution analysis to evaluate in vivo or in situ effects of physical, chemical, and electrochemical changes on both the solid and solution phases. (In many applications, the release of constituents into solution is the primary concern rather than degradation of the material, per se, and the invention can determine when during service life, this release occurs.) An advantage of the invention is that it evaluates the material after it has stabilized at potentials representing the service conditions other than the resting (open circuit) potential of the material in the test solution. This allows the corrosion rates and stabilized surfaces to be measured directly at any solution redox to represent the effects of radiolysis, bioactivity, or corrosion itself. When dealing with hazardous waste form materials, another advantage of the protocol is that it provides greater confidence in predicting both the releases of contaminants and the longevity of the material in a given environment, including as that environment changes over time.

Still another object of the invention is to establish functional dependencies on environmental variables that can be used in computer simulations of material corrosion in any redox environments based on electrode kinetics theory, mixed potential theory, passivation theory, and electric circuit analysis. A feature of the invention is exposing materials to various solutions simulating a range of real world conditions to determine the functional dependencies of materials' corrosion characteristics on key environmental variables. (For example, the imposition of a potentiostat represents Eh (redox) conditions that could possibly occur in the environment.) An advantage of the invention is that the results of the exposure provide a mechanistic understanding of the corrosion process and quantify the corrosion rate as a function of the materials' phase compositions, and also a function of key variables of the environment.

Another object of the invention is the utilization of electrochemical tests on multiphase materials to develop and parameterize degradation models for metallic waste forms, where the alloys represent waste forms are made with metal (e.g. steel, zirconium) cladding and metallic fuel waste. Features of the models include enabling the design of waste forms to accommodate waste constituents in durable phases, and demonstrating that production methods generate waste form products having consistent properties. An advantage of the implementation of these models is that they instill confidence that the waste forms will meet regulatory requirements during storage, transport, and permanent disposal.

Further, an object of the invention is to provide a test method supporting the design of radiological waste forms which are corrosion resistant in a range of seepage water compositions likely to occur throughout the regulated service life of a disposal facility. A feature of the method is that it subjects prototype materials used in the formulation of alloy waste forms to actual service conditions (and during the development of those service conditions) to ensure that the waste forms will be durable under the full range of environmental conditions, possible in disposal systems. An advantage of the invention is that siting and useful life determinations are more accurate, eliminating unscheduled downtime and catastrophic failure of buried structures. Another advantage of the invention is improving safety and performance assessment calculations by relating the electrochemical processes controlling the oxidation rate to the mass release rates of radionuclides of interest, and at specific points during the service life.

Yet another object of the present invention is to provide medical material tests which can be conducted under service conditions (e.g., blood pH and Eh) with representative surfaces (passivated, leached, or actively corroding) of the material at different service ages. A feature of this invention is that biomaterial corrosion behaviors are measured in simulated in vivo conditions, those conditions which represent various physical activities/health of a patient. The results of these measurements are used to predict long-term performance based on an individual's body composition and plasma properties, the concentrations of medications present or anticipated as a person ages, and physical activity level during the service life of the implant.

Further, an object of the invention is to provide a test method to test and predict the performance of coatings at specific life cycle points in realistic service environments. A feature of the method is that it subjects prototype coated materials to tribology and wear situations. An advantage of the method is that it ensures that the coatings are both physically and electrochemically durable under service conditions.

Still another object of the present invention is providing a model circuit that represents the electrical properties of the stable material surface measured by using electrochemical impedance spectroscopy (EIS). The circuit relates the electrical properties to the physical nature of the stable surface. A feature of the invention is that the test parameters can be selected to represent the type of material, service conditions, and performance measures relevant to the industry. An advantage of the invention is that the method can be applied to durable and degradable materials representing a wide range of applications.

Briefly, the invention provides a method for assessing the corrosion behavior of materials, the method comprising combining multiple electrochemical processes and modeling techniques to develop an electrochemical corrosion profile for a material of interest; wherein the imposed test conditions represent in vivo conditions; analyzing currents measured in the electrochemical processes; and comparing corrosion behavior of the material under several different environmental conditions to quantify dependencies for use in simulation models.

Specifically, the invention provides a method for predicting corrosion rates of a material under a plurality of service conditions, the method comprising: determining a first phase composition of the material surface prior to corrosion; exposing the material to a solution representing one chemical service condition; applying an electrical potential to the exposed material to represent the redox strength of a second service condition; identifying the corrosion activity for first and second service conditions; and determining a second phase composition of the material after corrosion. The chemical and electrochemical conditions used in the tests are selected based on the anticipated service conditions for the material and the performance aspects to be modelled.

The invention further provides a system for predicting release of radionuclides from buried waste forms, the system comprising a potentiodynamic scan to associate redox values at the surfaces of the waste forms to corrosion behavior of those forms; a potentiostatic analysis to determine current at the surfaces as they corrode; an electrochemical impedance spectrograph to reveal changes in electrical properties of the surface during corrosion; relating the changes to measured corrosion currents; current and surface electrical properties during corrosion; and a circuit representative of the surface properties as derived by the spectrograph, wherein the circuit can be related to physical models.

Also provided is a method for determining radionuclide source terms, the method comprising supplying a multiphase waste form containing the radionuclides; immersing the waste form in a solution representing repository chemistry; and oxidizing the immersed waste form for a period of time and at a particular voltage representing the redox strength of the repository chemistry to establish a steady corrosion rate of the waste form.

BRIEF DESCRIPTION OF DRAWING

The invention together with the above and other objects and advantages will be best understood from the following detailed description of the preferred embodiment of the invention shown in the accompanying drawings, wherein:

FIG. 6A is an SEM photomicrograph of an electrode surface before PD scan;

FIG. 6B is an SEM photomicrograph of an electrode surface after PD scan, showing preferential corrosion of one phase, in accordance with features of the present invention;

DETAILED DESCRIPTION OF THE INVENTION

Figure 1A:
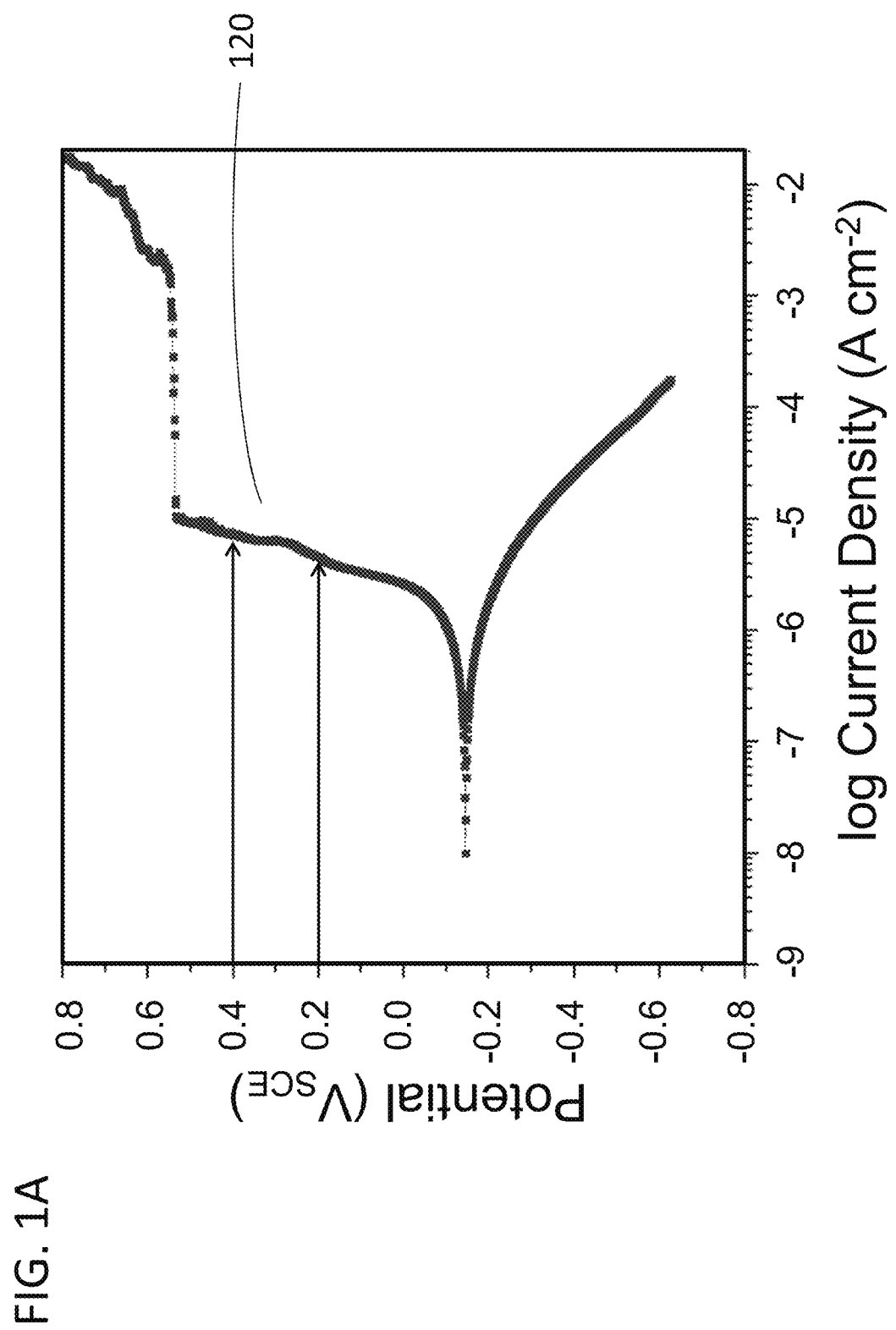
FIG. 1A is a potentiodynamic scan graph, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Electrochemical
Basis of Invention

The invention provides a method of combining multiple processes and modeling techniques to produce a comprehensive understanding of a material's suitability for various medical, commercial and industrial uses based on its electrochemical corrosion behavior.

Electrochemical corrosion occurs through chemical reactions that involve the transfer of electrons from the solid to solution species at solid/solution interfaces. The invention utilizes electrochemical tests to quantify the corrosion behaviors (tendencies to passivate, currents, elemental preferences, de-alloying, and corrosion products) of representative multiphase alloys, alloy/ceramic composites, and coated materials under a range of conditions relevant to the intended service environments.

The use of electrochemical methods to represent the corrosion rates of passivated waste forms pertinent to long-term disposal is based on the fact that the redox reactions occurring between the solution and a particular metallic surface fix the electrical potential of the surface at a voltage that depends on the redox strength of a solution, which is quantified as the solution Eh value, in volts. In most systems, redox reactions involving $H^+$ and dissolved $O_2$ in the solution are coupled with oxidation reactions of metals at the surface through electron transfer. This is represented in terms of the various oxidation and reduction half-reactions for different species in the solution and on the surface. Some half reactions are as follows:

| Solution Reduction Reactions | Material Oxidation Reactions |
|---|---|
| $2H^+ + 2e^- \rightarrow H_2$ | $Fe \rightarrow Fe^{2+} + 2e^-$ |
| $O_2 + 4e^- \rightarrow 2 O^{2-}$ | $Fe^{2+} \rightarrow Fe^{3+} + e^-$ |
| $SO_4^{2-} + H_2O + 2e^- \rightarrow SO_3^{2-} + 2 OH^-$ | $Cr \rightarrow Cr^{3+} + 3e^-$ |
| $H_2O_2 + 2e^- \rightarrow 2H^+ + 2 O^{2-}$ | $Zr \rightarrow Zr^{4+} + 4e^-$ |
| | $Tc \rightarrow Tc^{4+} + 4e^-$ |
| | $Tc^{4+} \rightarrow Tc^{7+} + 3e^-$ |
| | $U \rightarrow U^{4+} + 4e^-$ |
| | $U^{4+} \rightarrow U^7 + 2e^-$ |

Each half reaction has a threshold potential that affects which coupled redox reactions can occur and will dominate under particular conditions. For example, in acidic solutions with low dissolved oxygen contents, coupling the Fe and Cr oxidation reactions with the $H^+$ reduction reaction will dissolve steel to release $Fe^{2+}$ and $Cr^{3+}$ into solution. In contrast, acidic solutions with high dissolved oxygen contents will favor coupling of the Fe and Cr oxidation reactions with the $O_2$ reduction reaction. Initial corrosion will lead to the formation of $Fe_2O_3$, but the steel will quickly passivate by forming a film of $Cr_2O_3$. However, coupling of the Fe and Zr oxidation reactions with the $O_2$ reduction reaction will lead to active corrosion and the formation of $Fe_2O_3$ and $ZrO_2$. Mildly oxidizing conditions will lead to sparingly soluble $TcO_2$, but moderate and highly oxidizing conditions will form soluble $TcO_4^-$. The different kinetics of competing reactions will further complicate the observed behavior. The invention provides direct measurements of the preferred reaction paths under each service condition.

The invention provides a more sensitive method to measure the effects of alloy composition and processing methods, such as casting, powder metallurgy, and 3D printing, on long-term corrosion behavior of multiphase alloys being developed for use in the biomedical, automotive, and aerospace industries. The invented method uses data from several sources, including the type of material, service conditions, and performance requirements to arrive at corrosion propensities and characteristics of the material to be measured. For example, the invention provides a means for mimicking the acid-base environment and effects of the oxygen content of blood so as to subject target materials to that environment over sustained periods of time. This enables profiles to be measured as the behavior of those materials change over time under the relevant range of in vivo conditions to support development of implant materials having ideal corrosion properties for those in vivo conditions.

The invention also provides a sensitive method to quantify effects of microstructures resulting from different processing methods, such as casting, hot isostatic pressing, wrought, and 3D printing on corrosion behaviors of alloys, alloy/oxide composites, and semiconductor materials.

The invention provides a sensitive method to quantify the corrosion behavior of small specimen areas (on the order of 100 square micrometers). This aids to distinguish the corrosion behavior of different regions of the heat affected zones in welds and other inhomogeneities.

The invention provides a sensitive method to measure the quality and performance of the interface between a substrate and coating, including metal/metal, metal/ceramic, and oxide/semiconductor interfaces.

Electrochemical test methods are used to quantify metals and their alloys for a myriad of applications, including medical, industrial, and waste burial.

Analytical expressions are provided herein to represent ranges of environmental dependencies and conditions. (These conditions are not practical to simulate using state of the art immersion test methods). The expressions enable the modeling of long-term material performances. Electrochemical techniques including potentiodynamic (PD) and potentiostatic (PS) tests, and EIS analysis provide corrosion rates of metallic waste forms and engineering materials under the range of Eh-pH conditions that could occur as the surfaces stabilize under service conditions.

The results of electrochemical tests with multiphase alloys were used to develop and parameterize a degradation model for metallic waste forms. A test protocol was developed combining the electrochemical methods with microscopy and solution analysis to measure the corrosion behavior and kinetics under imposed redox (Eh) and chemical conditions. The results provide a means to quantify the effects of passivation and leaching on the corrosion rates of multi-phase metals, show effects of specific elements in waste (e.g., noble metals) or added as trim to improve passivation, derive analytical dependencies of rate based on environmental variables, and improve waste formations.

Specimens cut from cast ingots were fashioned into electrodes used to measure the corrosion kinetics under a range of conditions. Potentiostatic tests were conducted at several voltages spanning the range of redox potentials that could occur in seepage waters accumulating in breached waste packages to quantify the effect on the degradation rate. Currents were monitored for several days at applied voltages leading to steady cathodic, active, passive, or transpassive corrosion behaviors.

Electrochemical impedance spectroscopy scans were performed daily to relate the measured currents to changes in the electrical properties of the corroding surface due to the formation or degradation of passivating films during those tests. The corroded electrode surfaces were characterized with scanning electron microscopy to correlate the electrochemical responses with the corrosion of specific phases or interfaces.

The results show how distributions of passivating elements in constituent phases affect the corrosion behavior and illustrate how long-term degradation is being modeled.

The analytical model based on an oxidative-dissolution mechanism of alloy corrosion assists in the formulation of alloys that are durable under a myriad of service environments and for different applications, such as geological repositories, nuclear reactor sarcophagus venues, chemical processing systems, structures, pipelines, and medical implant systems. The model relates the electrochemical processes controlling the oxidation rate to the mass release rates of constituents of interest, such as radionuclides, wherein the oxidation rate limits the release rate.

Source Term
Applications

The invented model is used to calculate radionuclide source terms needed for safety and performance assessment calculations that will be conducted as part of the design and licensing of geological high-level radioactive waste repository facilities in the US. (The "source term" represents the amount of a radioactive contaminant that becomes available for transport (for example via underground aquifer) over time, and is one of the terms in a linear differential equation used to model contaminant transport.) Using accurate radionuclide source terms in performance assessments improves the design and confidence for licensing of geological high-level radioactive waste repositories in the United States.

The source term model for metal waste forms is based on electrochemical principles, but the application of those principles to a multiphase waste form necessitates that the analytical formulations of dependencies on environmental variables and values of model parameters be determined empirically. The semi-empirical analytical model developed to calculate radionuclide source terms includes analytical functions that take into account the following effects:

environmental variables on the electrochemical oxidation reactions with the alloy phases during active and passive corrosion;

the attenuating effect of surface passivation on the oxidation reactions; and the dissolution behaviors of oxidized radionuclides.

The dependencies of the oxidation reaction rates on key environmental variables and parameter values are measured for several alloyed materials that represent a range of possible metallic waste form compositions under conditions spanning the range of environments that may occur in geological disposal systems.

The invented source term model uses process models based on electrode kinetic theory to represent the oxidation rates of constituent alloy phases and reaction affinity theory to represent the dissolution rates of radionuclide-bearing oxides to calculate radionuclide source terms.

The electrometallurgical reprocessing of used metallic fuel to recover and recycle U and Pu generates two waste streams: salt wastes comprised of electrorefiner salt contaminated with oxidized fission product fuel wastes and metallic wastes comprised of activated cladding hulls and metallic fission product fuel wastes that were not oxidized under the processing conditions.

Metallic waste forms are made by directly melting the cladding and fuel wastes with small amounts of trim metals to form a multi-phase alloy in which radionuclides and other waste constituents become immobilized in various intermetallic and solid solution phases. The durability of each phase controls the release of the radionuclides it contains.

Electrochemical principles are applied to multi-phase waste forms incorporating radionuclides to determine the overall corrosion rates of the waste forms, which depend on the coupled corrosion of all constituent phases. The principles use analytical formulations of dependencies on environmental variables that can be used to calculate radionuclide source terms used in contaminant transport models. Subsequent transport is controlled by various processes acting on the contaminant, including advection, diffusion, sorption, precipitation, etc.

The conceptual model for the release of radionuclides into groundwater as the waste form corrodes is based on a two-step process in which oxidation of the radionuclides and host alloys is the first step and dissolution of the oxides to release radionuclides into solution (or transportable colloids) is the second step. Oxidation of metal atoms in the waste form occurs through electrochemical reactions with (or facilitated through) the contacting solution at rates that can be modeled by using electrode kinetics theory. The suite of redox-sensitive solutes in the solution establishes the corrosion potential at the alloy surface that controls the oxidation rate of each metal atom. Oxidation of radionuclides can occur directly through redox reactions with solutes or indirectly through reactions catalyzed by the metal surface, and can be affected by galvanic couples and other processes that either protect or sacrifice particular elements or phases.

The oxidation state of the oxidized radionuclide determines the propensity for dissolution into a solution of interest. For example, relatively little $Tc^{4+}$ will be released into solution from Tc(IV)-bearing phases such as $TcO_2$ but essentially all $Tc^{7+}$ will be released (e.g., as $TcO_4^-$) if Tc is oxidized to Tc(VII). The higher oxidation states of transuranics generally have higher solubility limits, so both the oxidation and dissolution steps are sensitive to the solution Eh and pH, since $H^+$ is an important oxidizing agent.

The invented method includes taking into account the effects of environmental variables on the electrochemical oxidation reactions with the alloy phases during corrosion, the attenuating effect of the surface passivation, and the release of dissolved or colloidal species into solution.

Understanding the reaction kinetics of the material of interest improves the understanding of the corrosion properties particular to the material. Thus, knowing that a stable measured current indicates stable redox reaction kinetics are occurring at the surface of the material. This provides confidence in predicting the long-term performance of the material of interest.

FIG. 1A-D is a schematic depiction of the invented system and method. A potentiodynamic scan (FIG. 1A) may be performed to identify potential ranges having similar or unique behaviors 120 as a basis for selecting potentials to be used in the electrochemical tests. (Potentiodynamic tests provide information on the passivation behavior of a material.) The scan subjects the surface to a predetermined range of voltages in order to measure the dependencies of the anodic corrosion rate on the solution Eh and other environmental variables (namely, pH, T, and chloride ion concentration) and parameterize performance models.

To generate the potentiodynamic scan shown in FIG. 1A, a range of potentials was applied, starting at the lower potential at $-0.6$ $V_{SCE}$ and scanning to the higher potential at $+0.7$ $V_{SCE}$. A Nearly constant current (vertical line) is measured as the potential is scanned between about 0 and 0.5 $V_{SCE}$, (thereby indicating passivation). Transpassive corrosion occurs above about 0.5 $V_{SCE}$ wherein the current increases rapidly as the potential increases.

Metal dissolution rate is proportional to the current. The metal dissolves rapidly under active or transpassive behavior but very slowly under passive behavior.

The arrows in FIG. 1A drawn at potentials of 0.2 and 0.4 $V_{SCE}$ indicate potentials used in potentiostatic tests conducted on freshly polished electrodes. Both voltages are in the passive region of the potentiodynamic curve in the graph 120. All reported voltages are with reference to a saturated calomel electrode (as $V_{SCE}$).

SEM analyses (125 in FIG. 1B) performed after the potentiodynamic scan (FIG. 1A) are used to identify phases that corroded actively during the scan and any alteration products that formed.

Potentiostatic Test

Detail

Chemical control of the solution redox (Eh) is difficult due to the very strong effect of dissolved $O_2$, even at very low concentrations in controlled atmosphere gloveboxes. However, the surface potential at any solution Eh can be simulated by using a potentiostat to fix the potential at the desired value. Using a potentiostat compensates for fluctuations in the environmental effects on the surface potential (such as changing chemistry due to material dissolution) during the test, so the measured current corresponds to a known surface potential.

Furthermore, using a potentiostat to control the surface potential allows any potential of interest identified by the potentiodynamic step to be applied to a surface that is contacted by any solution composition of interest. This allows the effects of the solution Eh and the effects of the solution chemistry (particularly the pH and $C^-$ content) on the material corrosion behavior and corrosion rate to be distinguished. This provides a means for generating databases for parameterizing a mathematical model that can be applied to a wide range of conditions, including those not readily simulated in a laboratory.

Figure 1B:
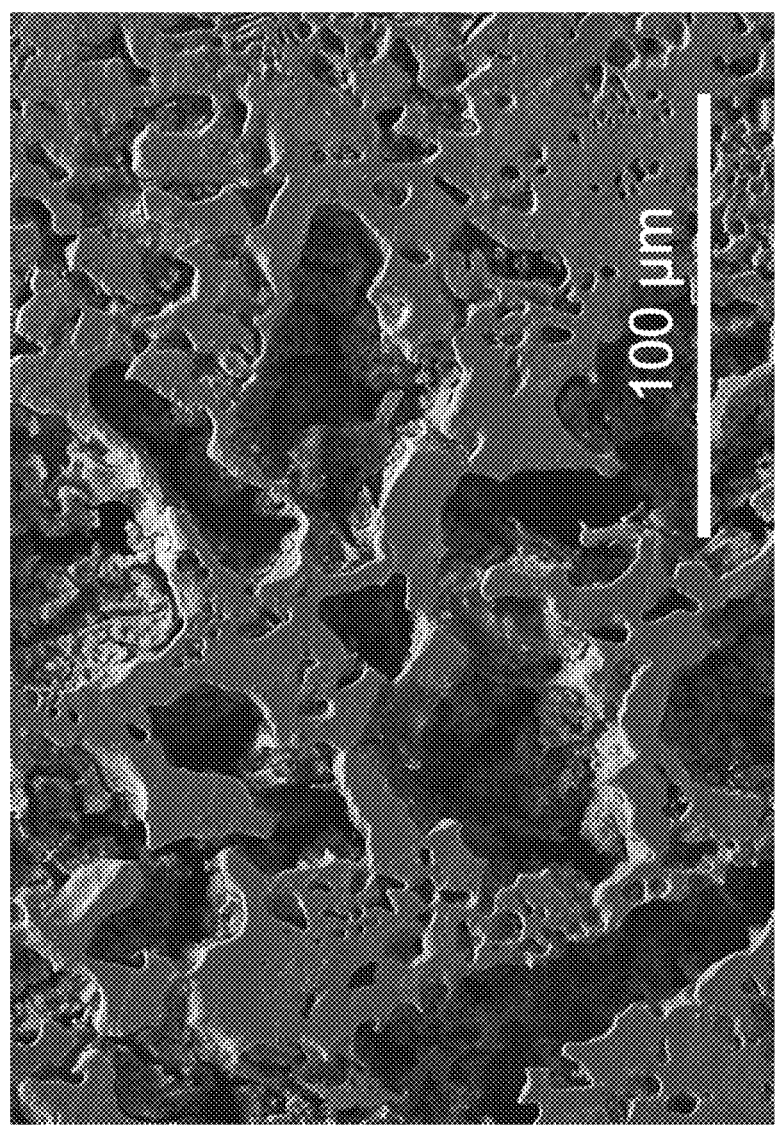
FIG. 1B is a scanning electron micrograph of corrosion layers, in accordance with features of the present invention.
Figure 1C:
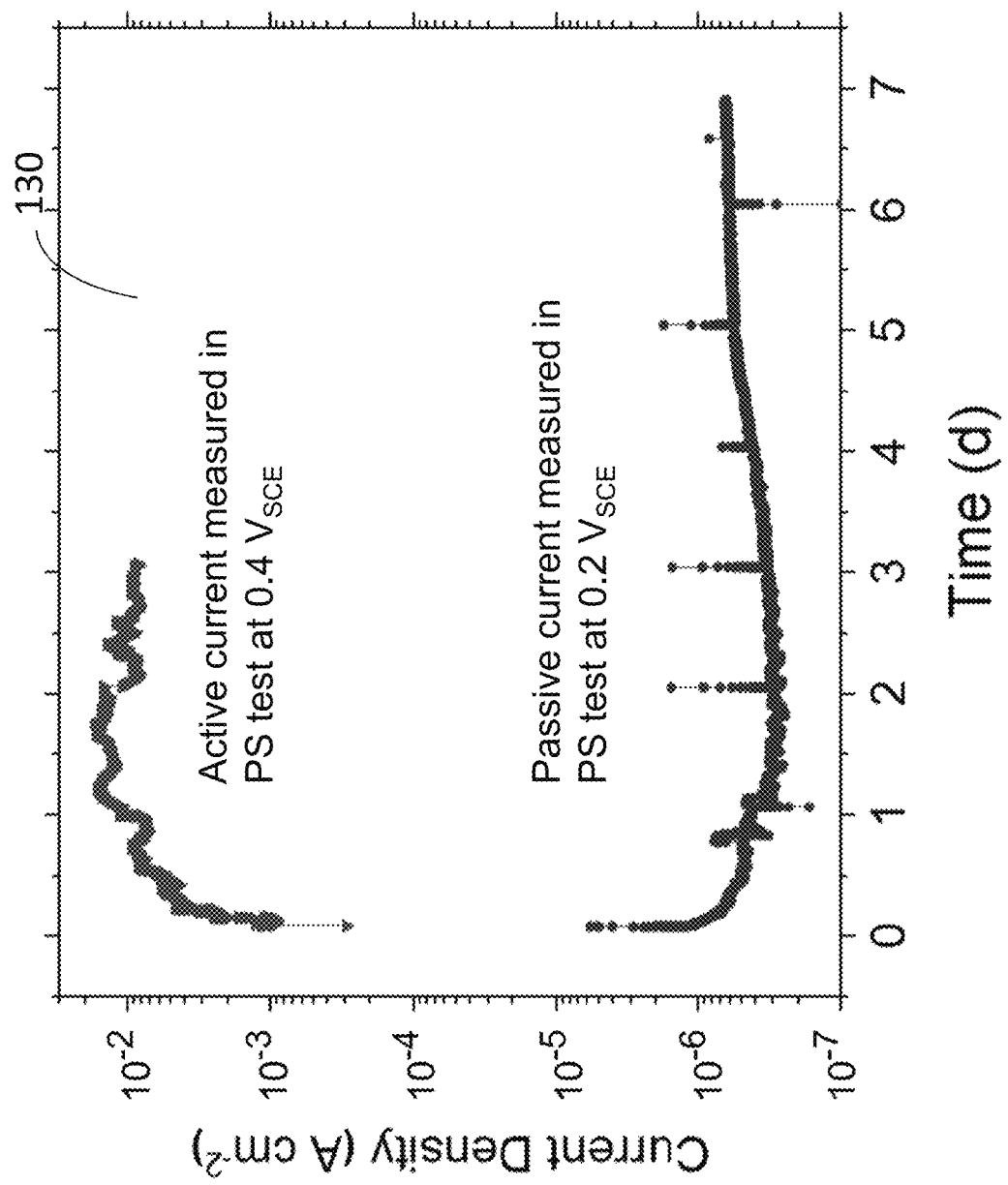
FIG. 1C is a potentiostatic test graph, in accordance with features of the present invention.

Potentiostatic tests (element number 130 in FIG. 1B) therefor are applied to measure the corrosion rates at all identified electrical potentials of interest. Specifically, the tests are analyzed to relate the mass release rates to the electrochemical corrosion rate. The results of potentiostatic tests at voltages indicated by the arrows in FIG. 1A at 0.2 and 0.4 $V_{SCE}$ (element number 130 in FIG. 1C). Passive corrosion is observed at 0.2 $V_{SCE}$ with a stable current density near $0.7 \times 10^{-6}$ cm-2 achieved after about 5 days but active corrosion is observed at 0.4 $V_{SCE}$ with a stable current density near 0.01 A cm-2 achieved within 1 day. This shows the passivation shown in the PD scan at 0.4 $V_{SCE}$ could not be sustained. FIG. 1C compares Bode phase angle plots of the EIS analyses during the PS test at 0.2 $V_{SCE}$, which show stable responses are obtain after 5 days.

Aliquants of solution removed from the test solutions during testing and after testing are analyzed to measure the amounts of constituents released during corrosion. Concentrations can be measured before and after passivation layers form at each potential to provide insight into the degradation model. The masses of dissolved metals released into the solution are calculated from the measured concentrations and solution volume. To determine the mass released during the intervals between two solution collections in the same PS test, the mass calculated at the end of the first sampling interval is treated as background mass and subtracted from the mass calculated at the end of the second interval.

The masses released to solution are used to calculate the normalized corrosion rates by dividing the mass of an element released during the test interval by the surface area of the electrode, the overall fractional mass fraction of that element in the material, and the reaction time over which the element accumulated in the solution. The normalized release rate based on the mass of species i in solution, NR(i), is calculated as $$NR(i) = \frac{m(i)}{S x f(i) x t}$$

where m(i) is the mass of species i in solution, S is the surface area of the electrode, f(i) is the mass fraction of i in the material, and t is the test interval. The normalizations allow for direct comparisons of NR(i) values for different electrodes, dissolved elements, imposed potentials, leachant solutions, and test intervals.

Mass fractions were calculated from the gross compositions of the electrode material and the areas of electrodes were determined from SEM images used. The normalizations allow for direct comparisons of NR(i) values for different electrodes, dissolved elements, imposed potentials, leachant solutions, and test intervals. The combination of the measured current, SEM analyses of the corroded electrode, and solution analyses provides insight into the relative release rates from different constituent phases.

Separate potentiostatic tests 130 are performed at each potential of interest over an extended period. Voltages used in PS tests are chosen based on features seen in the PD scan or based on the service environment of interest. That is, if a particular industrial process imposes a particular range of voltages, potentials within the range are chosen. If a change in behavior is observed at a particular voltage, then more potentiostatic tests may be performed at and near that voltage to comprehensively understand and quantify how the changes in the environment and/or the material affects performance.

If a change in the surface conditions of the material is observed to occur over time at a particular potential, the potentiostatic tests 130 are continued until a stable current is attained. This may occur due to the stabilization or destabilization of passivation layers over time. The stable current density attained in each potentiostatic test 130 is used to calculate the material corrosion rate under those specific environmental conditions.

The results of a series of potentiostatic tests in which one or more variables are changed (such as the applied potential representing the solution Eh, the pH or chloride concentration in the solution, and/or the temperature) can be used to derive an analytical equation representing the dependence on key variables such as Rate=fn(Eh, pH, Cl, T). The analytical expression may relate the measured current density to individual or combinations of variables by multivariate regression analysis.

The potentiostatic tests 130 depicted in FIG. 1C show a stabilized passivation layer formed at 0.2 $V_{SCE}$ but transpassive corrosion at 0.4 $V_{SCE}$. This data allows material developers to realize that one or more of the metallic phases will corrode rapidly under redox conditions above 0.4 $V_{SCE}$ in those chemical conditions. As such, this portion of the invented protocol advises developers that their proposed material may not provide suitable performance at redox conditions above 0.2 $V_{SCE}$. The SEM analyses of the electrode from the PD scan (FIG. 1B) indicate which phase(s) corroded and what corrosion products formed.

EIS analyses (graph number 140 in FIG. 1D) may be performed during the potentiostatic test 130. EIS is used to determine electrical properties of the material surface by measuring the impedance of the surface as it passivates. As such, EIS provides a means to monitor the changes in the material's electrical properties.

Electrochemical impedance is usually measured by applying an AC potential to the working electrode in an electrochemical cell and measuring the AC current passing through the cell. A sinusoidal potential excitation is applied, and the response to the potential is an AC current signal which can be modeled as a sum of sinusoidal functions am devaluated as a function of the applied AC frequency. Usually electrochemical impedance is measured using a small excitation signal so that the cell's response is pseudo linear.

The current response to a sinusoidal potential will be a sinusoid at the same frequency but shifted in phase, where the excitation signal is expressed as a function of time ($E_t=E_0 \sin(\omega t)$). $E_t$ is the potential at time, $E_0$, is the amplitude of the signal, and $\omega$ is the radial frequency.

The relationship between radial frequency $\omega$ (expressed in radians/second) and frequency f (expressed in hertz) is $\omega=2\pi f$. In a linear system, the response signal $I_t$, is shifted in phase ($\phi$) and has a different amplitude than $I_0$. $I_t=I_0 \sin(\omega t+\phi)$.

An expression analogous to Ohm's law allows for the calculation of the impedance of the system as:

$$Z = \frac{E_t}{I_t} = \frac{E_0 \sin(\omega t)}{I_{0 \sin(\omega t+\phi)}} = Z_0 \frac{\sin(\omega t)}{\sin(\omega t + \phi)}.$$

The impedance is expressed in terms of a magnitude $Z_0$, and a phase shift, $\phi$.

As such, EIS quantifies the electrical impedance properties of the material's surface that can be interpreted as capacitive and inductive characteristics. Differences in the EIS results indicate the different passive layers that form under different redox and chemical conditions. Conversely, EIS that remain constant as the PS test proceeds indicate the surface has stabilized. The EIS 140 measures the electrical impedance properties of the passivation layer based on the AC current response to an AC voltage scanning over a user-defined range of frequencies.

The combination of a stabilized current in the potentiostatic tests and evidence of a stabilized passivating layer in the EIS responses is a means to indicate the formation of a stable material in service. Specifically, these measured corrosion currents and the calculated corrosion rate represent the electrochemical properties of a stable (and therefore viable, long lasting) electrode surface formed under test conditions representing a particular environment. (The electrode material is selected as the single alloy or a multiphase composite material actually put into service.) Furthermore, an equivalent circuit model (discussed infra and depicted in FIG. 10B) based on the EIS results is used to postulate a physical model of the surface that is consistent with the material's electrical properties under those conditions. As such, the circuit model may be used to represent the corrosion characteristics of the metal under the environmental conditions represented by the test over time as long as the passivating layers can be sustained.

The EIS spectra may be analyzed using standard analyses and represented using Bode and Nyquist plots. The expression for $Z(\omega)$ is composed of real and imaginary parts. In a Nyquist plot, the real part is plotted on the X-axis and the imaginary part is plotted on the Y-axis. Each point on the plot represents the impedance at one frequency. The impedance may be represented as a vector (arrow) from the origin of length $|Z|$. The angle between this vector and the X-axis, called the phase angle, is f (=argZ). Because Nyquist plots do not indicate what frequency was used to record that point, Bode plots showing the frequency information are also used to display EIS results. In the Bode plots, the log frequency is plotted on the X-axis and the absolute value of the impedance ($|Z|=Z_0$) and the phase-shift are plotted on the Y-axes. These are referred to as Bode magnitude and Bode phase angle plots, respectively.

A sample of the solution of interest is used to quantify the amounts of oxidized (i.e., dissolved) species released into solution as the material corroded during the potentiostatic test 130. The dissolved species may enter the solution by leaching or surface dissolution mechanisms. A surface analysis of the material of interest may be performed to determine by which process the dissolved species is released into the solution. For example, if the material exhibits active current, then leaching from one or more constituent phases may be occurring. Alternatively, if the material exhibits passive current, then dissolution of passivating layers is more likely.

Figure 2B:
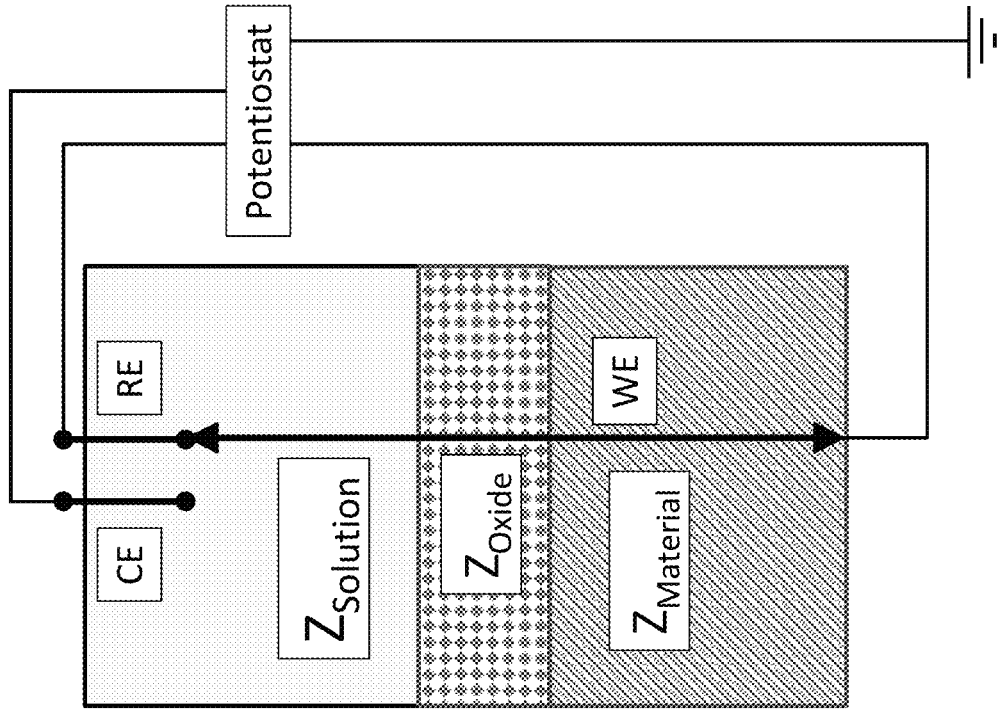
FIG. 2B is a schematic diagram of corrosion conditions applying the invented method, in accordance with features of the present invention.
Figure 2A:
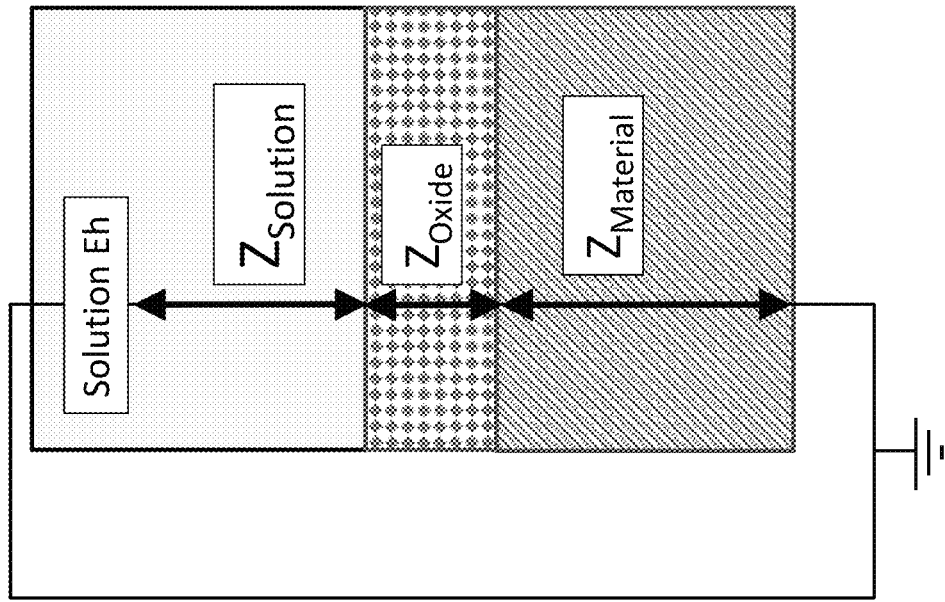
FIG. 2A is a schematic diagram of natural corrosion conditions.

FIG. 2 comprises two panels: FIG. 2A and FIG. 2B. FIG. 2A shows electrochemical corrosion conditions in the natural corrosion environment. The electrochemical corrosion conditions imposed by the invented system is depicted in FIG. 2B. As to FIG. 2A, the composition and redox strength (Eh) of the in vivo solution establish the chemical environment and electrochemical potential at the alloy surface. As such, coupled redox reactions in the natural system shown in FIG. 2A transfer electrons from the alloy to solution species. This establishes a corrosion current that depends on the solution redox properties and chemical resistance to electron transfers between coupled species.

As depicted in FIG. 2B, a surrogate solution is used to represent in vivo conditions and control environmental variables such as pH, chloride ion content, and temperature. A potentiostat is used to fix the electrochemical potential of the alloy surface at the desired value. The imposed surface potential is independent of the Eh of the surrogate solution. The generation of passivating oxides on the alloy surface impedes corrosion in both systems, and the experimental system quantifies the impedance provided by the passivating layers and the passive current.

The potential at the alloy surface in FIG. 2B is controlled relative a reference electrode (RE) via the potentiostat by using the alloy as the working electrode (WE), with current flowing to or from the WE through a counter electrode (CE). The voltage that is fixed by the potentiostat can be selected to maintain a surface potential representing that imposed by any solution of interest, including values that may be very difficult to attain experimentally by using a solution and controlled atmosphere. Different electrolyte solutions can be used to represent the chemistries of seepage waters in a breached waste package that have been affected by radiolysis, container corrosion, and the degradation of other waste forms. Thus, these different electrolyte solutions can impose a range of chemical effects anticipated to occur during burial while the potentiostat maintains the working electrode at the desired potential to mimic the Eh effects.

In addition to test conditions that represent the range of service conditions, potentiostatic (PS) tests can be conducted under extreme combinations of Eh and solution chemistry (e.g., pH and [Cl$^-$]) that may not be physically realistic, but can be used to derive environmental dependencies used in the model.

The current density that occurs as the electrode surface corrodes at an applied potential (either passively or actively) can be monitored in PS tests performed for many days until steady values representing stable systems and long-term behavior are attained. (The term "corrosion current" is traditionally used only to represent the current generated by corrosion at the open circuit potential. In this specification, the stable current density that is measured at an imposed potential is deemed to represent the current for environmental conditions being simulated under which the open circuit potential will correspond to the imposed potential.)

Different constituent phases are expected to passivate, pit, or corrode actively at various imposed potentials, but each phase is expected to eventually attain a steady corrosion rate that can be used to represent the long-term corrosion rate of the multi-phase material. Changes from initial transient behaviors of the polished surfaces can occur due to leaching, stabilization of metastable pitting, or the degradation of passive layers that form initially but cannot be sustained by the underlying alloy phases. (This was shown in the PS test at 0.4 $V_{SCE}$ in FIG. 1C.) Mass corrosion rates can be calculated from the stable currents that are measured in PS tests by using Faraday's law.

Figure 3A:
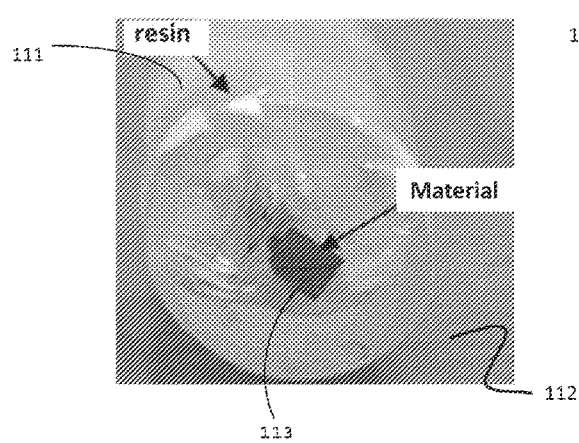
FIG. 3A is a perspective view of an electrode, in accordance with features of the present invention.
Figure 3B:
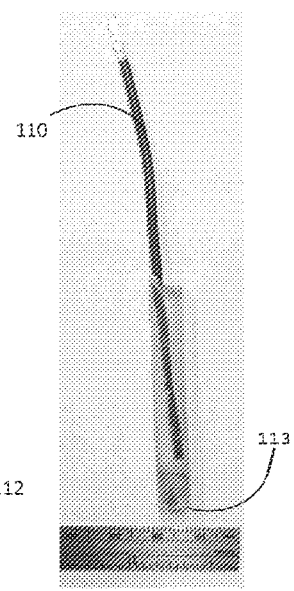
FIG. 3B is a side view of the electrode, in accordance with features of the present invention.
Figure 3C:
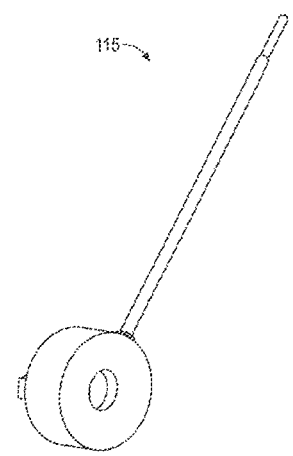
FIG. 3C is a perspective view of a micro-electrode mated with a commercial holder, in accordance with features of the present invention.

FIGS. 3A-3C are detailed views of an electrode construct. FIG. 3A is a perspective view of an electrode, in accordance with features of the present invention. FIG. 3B is a side view of the electrode, in accordance with features of the present invention. FIG. 3C is a perspective view of a micro-electrode mated with a commercial holder 115. For example, small electrodes are used to facilitate SEM examination of the entire electrode surface and measure the corrosion behavior of local regions, such as heat-affected zones in weldments. Selected regions of a material; full size electrodes, and standard 1 cm$^2$ electrodes in commercial holders may also be used.

A material of interest, such as a metal and/or its alloy (e.g., an alloy of stainless steel, Zr, Mo, Ru, Pd, Tc, and/or other metallic fuel waste), may define an elongated substrate 110 as an electrode. The elongated substrate 110 is surrounded by resin 111 to form a construct 112. The resin 111 may comprise an electrically non-conductive acrylic or epoxy which almost entirely encompasses the material, leaving approximately 2 mm$^2$ of a first end of the elongated substrate exposed to define an exposed surface 113. An electrical lead wire connected to a second end of the elongated substrate 110 is also embedded in the resin and extends from the second end of the electrode.

The exposed surface 113 is placed in a solution representing the chemistry of the service conditions that are of critical interest. Such critical chemistry parameters may include temperature, pH, chloride concentrations, dissolved salts (in the case of structural materials), radiation products such as $H_2O_2$ and $H_2$ (in the case of radioactive waste forms), and protein/medicament concentrations (in the case of medical implants). In summary of this point, test conditions may mimic those found in ground water, pressurized crude oil/natural gas pipelines, irradiated seepage water, biological fluids, etc.

Electrochemical tests are performed at potentials representing specific solution redox conditions or the range of redox spanned by the service conditions 315 that are of interest.

EIS and Model Circuit Detail

Using the results from the potentiostatic tests and EIS, an equivalent circuit 150 is derived to quantify electrical properties of the passivated surface and support a physical model of the corrosion system. The model circuit is designed to be consistent with the response seen in the EIS tests. The various resistors and capacitors represent the impedances to electrochemical anodic and cathodic reactions and transport barriers to electron and mass flow provided by the passive layers and interfaces. The circuit is applicable to the range of potentials for which the surface is stabilized by the same passivating oxides.

The equivalent circuit is used to estimate the passive current for the stabilized surface over the range of applied voltages for which the circuit applies by treating the capacitors and constant phase elements as open circuits. This eliminates the need to measure currents for intermediate voltages directly with additional potentiostatic tests. As such, the circuit provides a means to estimate for specific voltages between empirically measured voltages.

The equivalent circuit provides insights into the corrosion behaviors of the individual phases. The electrical properties of multiphase materials are often well-represented as single phases.

Figure 4:
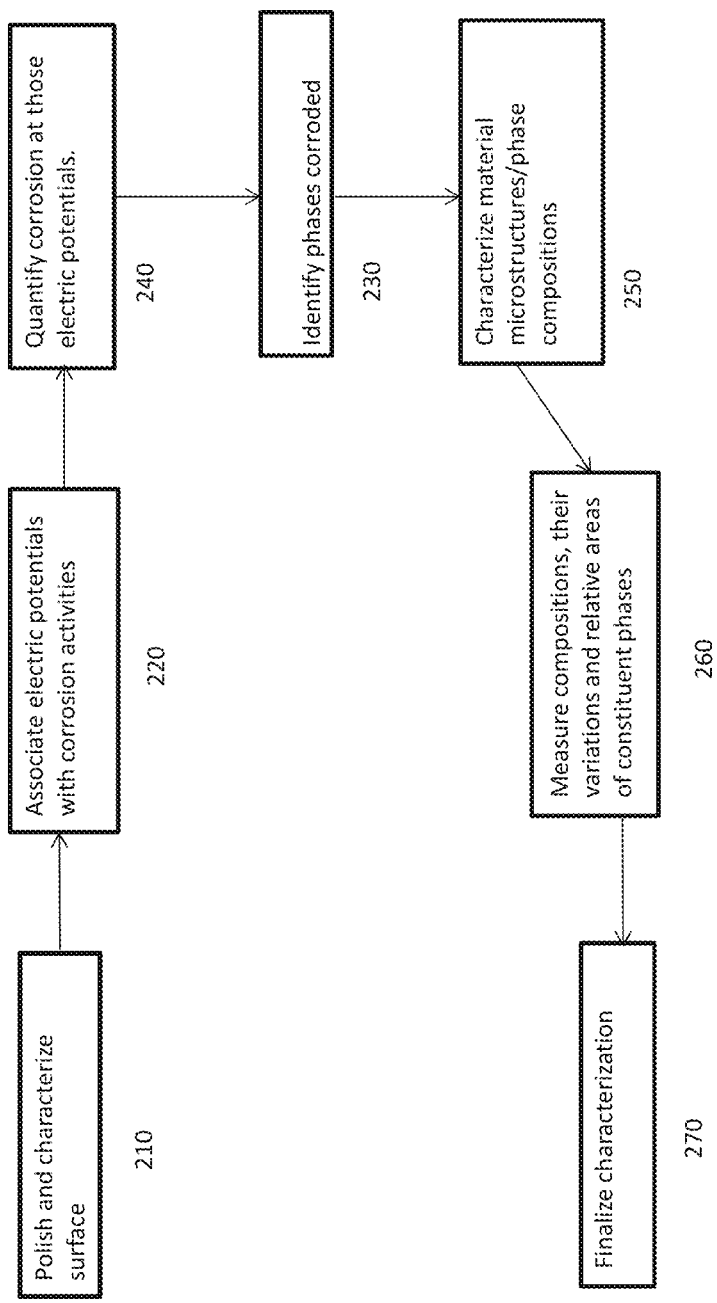
FIG. 4 is a flowchart of initial tests to characterize the corrosion behavior of materials, in accordance with features of the present invention.

FIG. 4 is a flowchart of the initial tests to characterize the corrosion behavior of materials. The electrode surface is polished to a predetermined finish (e.g. 1 μm finish) and characterized using SEM to document the phase composition 210. A potentiodynamic scan may be conducted in a solution of interest to identify the ranges of applied potential 220 for which the material shows propensities for active, passive, and transpassive behavior, based on the current response. The electrode surface is characterized 230 with SEM afterwards to identify phases corroded during the potentiodynamic scan.

Once the effects of the potentials on the corrosion behaviors are identified in the potentiodynamic scan 220, a series of potentials is selected for use in the potentiostatic tests to quantify the corrosion behavior 240 in the regions of interests.

The surface is repolished to remove any changes to the workpiece resulting from corrosion during the potentiostatic tests. Alternatively, a different or fresh electrode may be used. A reproducible surface finish within the range of 0.05 μm to 30 μm is suitable and a 1-2 μm finish is typical. Preferably the surface is consistent for all tests on the same material. Smoother polishes allow for better characterization of the initial microstructure. The objective of repolishing is to establish a fresh surface representing the bulk material.

The material's microstructure and phase compositions are then characterized by scanning electron microscopy with x-ray emission spectroscopy 250.

The compositions and relative areas of constituent phases in multiphase materials and composition variations within each phase are measured 260. The relative areas of constituent phases are determined using image analysis of SEM images or surface composition maps.

The electrode surface is polished and examined using an SEM to characterize and document the microstructures 270 in several regions having features that can be used to locate the same regions for examination after testing. Several regions are documented before testing because corrosion does not occur uniformly across the electrode. If carbon coating is required to evaluate the non-conductive phases during SEM analysis, that coating is wiped off or otherwise removed from the electrode surface after the SEM analysis. Otherwise the coating may interfere with the electrochemical responses measured in the tests.

Figure 5:
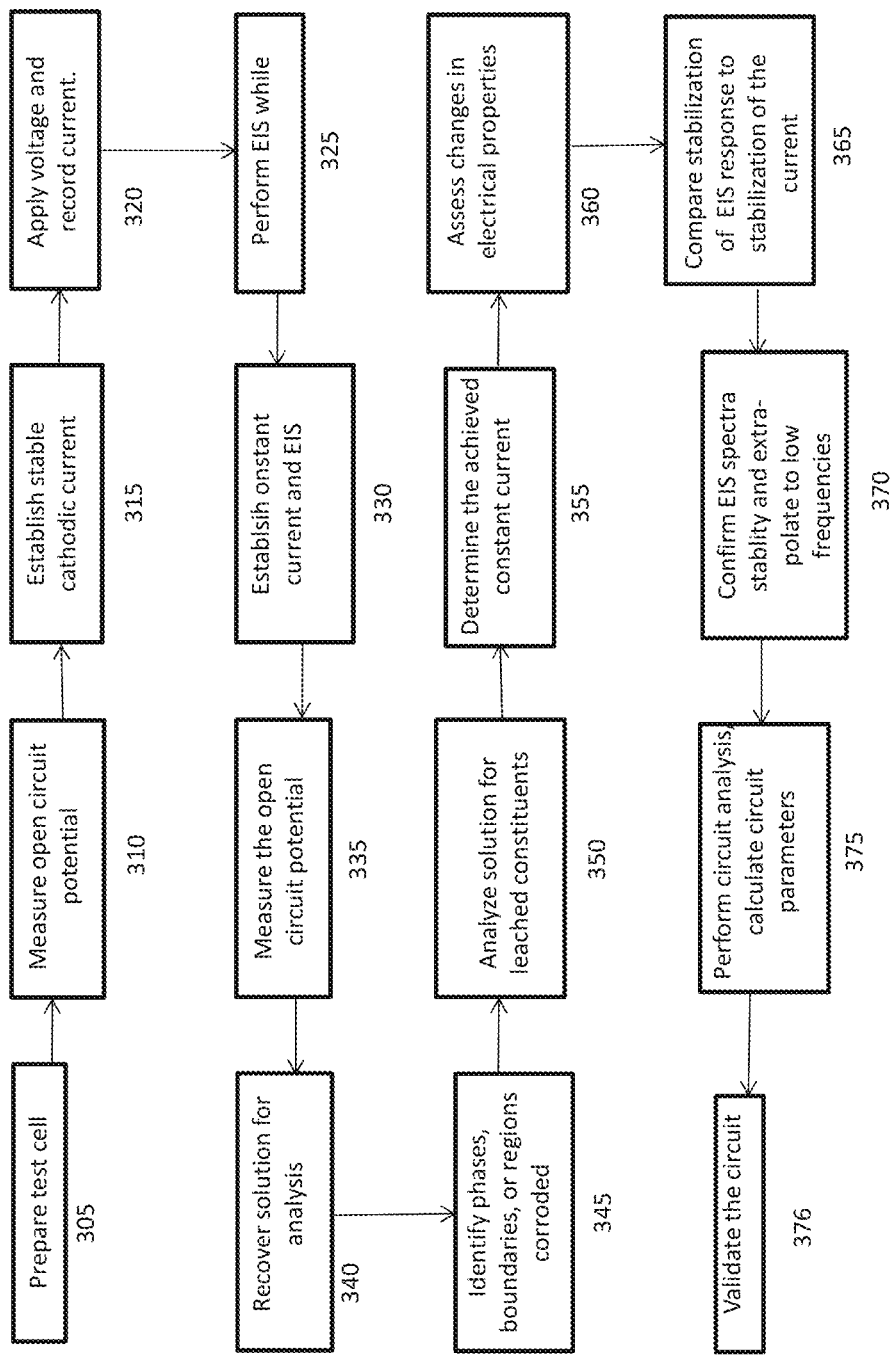
FIG. 5 is a flowchart of a method for determining corrosion off site (e.g., in vitro), in accordance with features of the present invention.

FIG. 5 is a flowchart of the potentiostatic test protocol utilized by the claimed method.

Potentiostatic tests are used to characterize the corrosion behavior of a metal surface in contact with the electrolytes of interest. The metal sample is known as the working electrode, while a reference electrode is used to monitor the potential at the working electrode surface. A potentiostat is used to maintain a constant potential at the working electrode surface and measure current passed through the electrolyte between the counter electrode and the working electrode to maintain that potential. Specifically, the potentiostatic tests evaluate changes in the current from when the potential is imposed on the bare surface of the material prior to, during, and after the formation of stabilizing passivation layers or leaching occurs to destabilize the surface.

The potentiostatic test protocol (FIG. 5) is conducted separately by holding an electrode at each potential of interest in each solution, as follows: The material electrode, appropriate reference, and counter electrodes are placed in an electrochemical test cell containing a solution 305. The open circuit potential is measured 335 immediately for a period of time (e.g., one second) to orient the potentiostat 310. The electrode surface is electrochemically cleaned 315 by applying cathodic voltage 0.5 V below the measured open circuit potential until a stable cathodic current is attained. The selected potentiostatic voltage 320 is applied and the electrode current recorded for the desired duration (typically 1 to 7 days).

EIS 325 is performed while continuing to apply the selected DC potentiostatic test voltage throughout the analysis. Each EIS analysis may be conducted over the range 100 kiloHz to 1 microHz, although other ranges may be appropriate for characterizing the layers that form on some materials. For example, potential layers that may form include, but are not limited to, Iron-based oxides ($Fe_2O_3$, $Fe_3O_4$), chromium oxide ($Cr_2O_3$), molybdenum oxide ($MoO_2$), nickel oxides (NiO, $Ni_2O_3$), nickel-molybdate ($NiMoO_4$), titanium oxide ($TiO2$), zirconium oxide ($ZrO_2$), aluminum oxide ($Al_2O_3$), zinc oxide (ZnO), Copper oxides (CuO, $Cu_2O$), silver oxide (AgO), palladium oxide, tantalum oxide ($Ta_2O_5$), tin oxide, cobalt oxides (CoO, $Co_2O_3$, $Co_3O_4$), and technetium oxide ($TcO_2$).

Figure 1D:
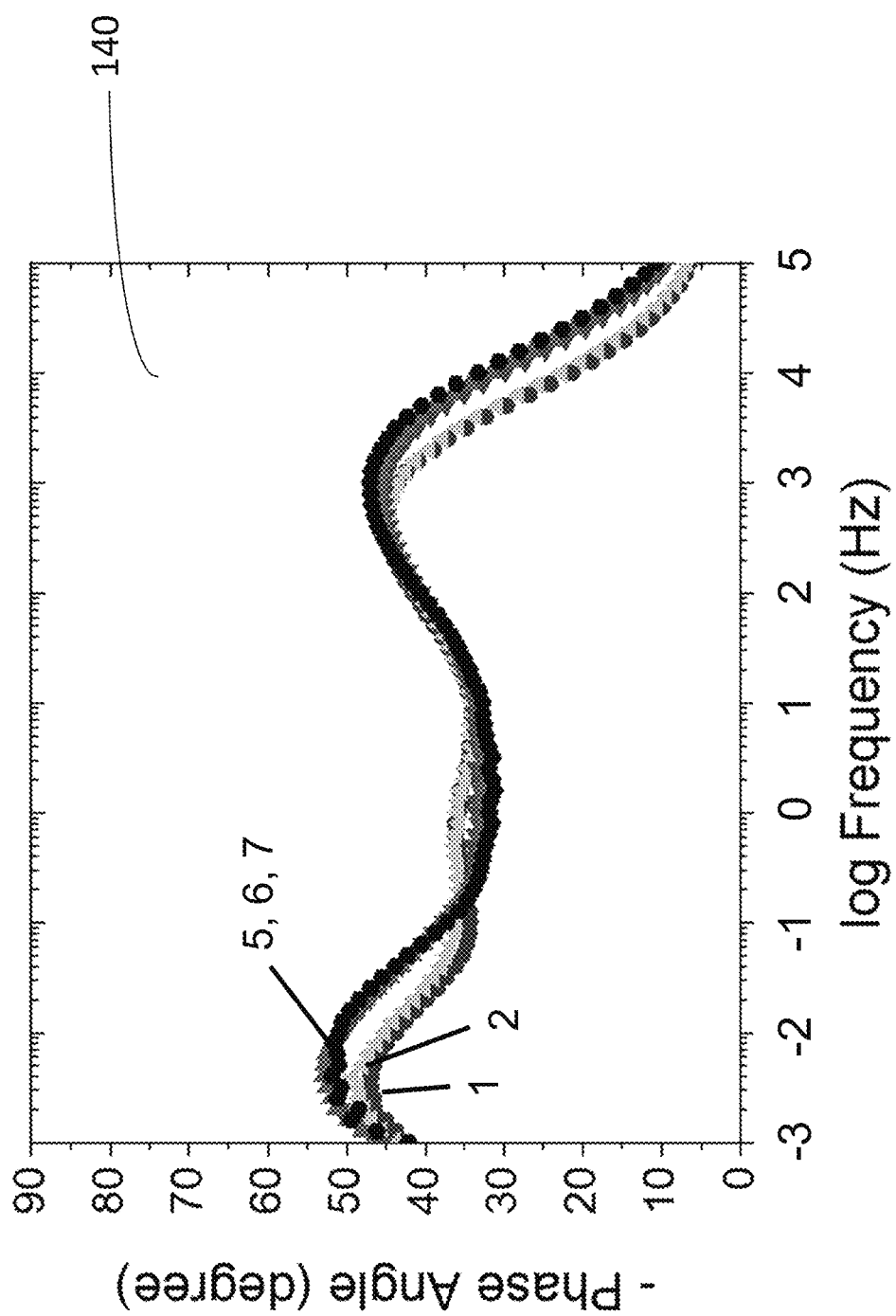
FIG. 1D is an electrochemical impedance spectroscopy (EIS) graph, in accordance with features of the present invention.

The potentiostatic hold is continued and EIS analyses are performed periodically until a constant current and several constant EIS responses are attained 330. The frequency with which EIS analyses are performed is selected to monitor the evolution of passivation layers and indicate when they have stabilized. Daily analyses through one week are expected to be appropriate for most materials and environments, but longer durations may be required for some systems and actively corroding materials such as low alloy steels. For example, FIG. 1D shows Bode phase angle plots for EIS analyses performed during a potentiostatic hold after about 1, 2, 5, 6, and 7 days. The plots after 5, 6, and 7 days are essentially identical and indicate the surface has attained a stable state.

Once a constant current and stable EIS responses are obtained, the surface has attained a stable state under the test conditions of electrolyte composition and imposed potential. Then the applied voltage is removed and the electrode is removed. An aliquant of the solution is immediately harvested for composition analysis 340.

The surface of the corroded electrode is allowed to dry and then examined using SEM to identify specific phases, phase boundaries, or regions that corroded 345 during the potentiostatic test. (The extent of corrosion may be undetectable on electrodes that passivated in potentiostatic tests.) The recovered solution also is analyzed for constituents released during the test, which may indicate release from particular constituent phases based on their compositions 350. The solution composition is more sensitive to corrosion than SEM analysis, but less sensitive than the measured current.

The series of EIS spectra obtained during a potentiostatic test are analyzed 360 (FIG. 5) to assess changes in the electrical properties due to surface degradation, the development of passive layers, and the stabilization or degradation of those layers. The stabilization of the EIS response is compared to the stabilization of the current measured in the potentiostatic test 365 to assess the stability of the surface.

Stable non-zero anodic passive currents indicate that the surface is undergoing anodic corrosion at a much lower rate than was measured initially for the bare surface, due to presence of passivating layers. In summary, the invention enables measurement of the current in the presence of the passive layer likely to occur throughout the service life (so long as the underlying alloy can maintain that layer).

Referring to FIG. 5, a Kramers-Kronig analysis was performed to confirm that the EIS spectra are reliable and extrapolate the results to low frequencies 370. The equivalent circuit analysis 375 for the stable EIS spectra collected near the end of the potentiostatic test at 0.2 $V_{SCE}$ shown in FIG. 1D represents the electrical properties of the stable passivated surface. Parameter values for the circuit components are determined by using commercial software.

The DC current at any imposed potential is calculated from the EIS circuit using Ohm's law by treating the capacitors and constant phase elements as open circuits. Comparison of the measured and modelled currents 376 provides a method to determine if the equivalent circuit is appropriate. Large differences in the modelled and measured currents indicate that the equivalent circuit model is not appropriate.

Small differences between the modelled current and the stable currents measured during the potentiostatic holds usually can be attributed to leakage current through the passivating layers that behave as imperfect capacitors. Comparison of the measured and modelled currents provides a means to determine the appropriate equivalent circuit.

The steady currents measured at different applied voltages in potentiostatic tests conducted in the same solution are compared to determine the dependence of the material corrosion rate on the potential. Based on this comparison, an analytical expression is derived relating the measured passive or active current to the potential for potential ranges in which the corrosion behavior is the same. Likewise, the steady currents measured at the same applied voltage in the potentiostatic tests in a series of solutions in which one variable is changed (e.g., tests at different pH) are compared to determine the dependence of the current on that environmental variable.

Based on these comparisons, an analytical expression that relates the stable current to individual or combinations of variables can be derived using multivariate regression analysis. The potential represents the solution redox and the current represents the material corrosion rate. Therefore, the analytical expression represents the corrosion behavior of a particular material in any environment of interest.

FIGS. 6A and 6B are SEM images of a surface region before and after a Potentiodynamic scan. Specifically, FIG. 6A shows the material of interest 400 before the potential was applied and indicates areas representative of two different phases in the material, e.g., a first phase 405 is not visibly corroded.

FIG. 6B depicts the material of interest 420 after corrosion at a fixed potential. As shown in FIG. 6B, significant corrosion has occurred in regions of the second phase 410 (specifically the spot 411 is completely corroded), while material of the first phase 405 has remained stable in the solution at the applied potential.

Figure 7B:
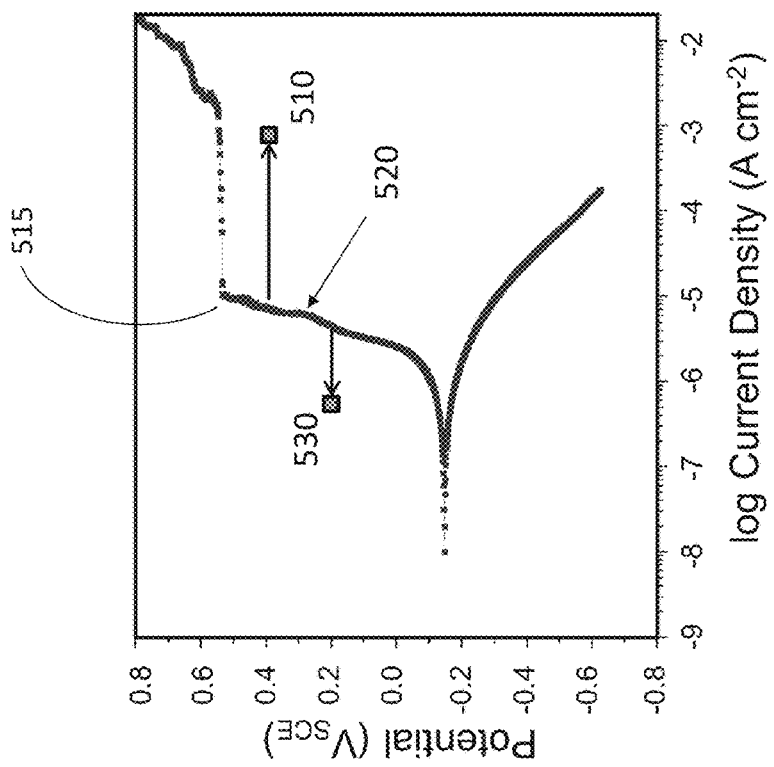
FIG. 7B is a comparison of the steady states depicted in FIG. 7A using a potentiodynamic scan, in accordance with features of the present invention.
Figure 7A:
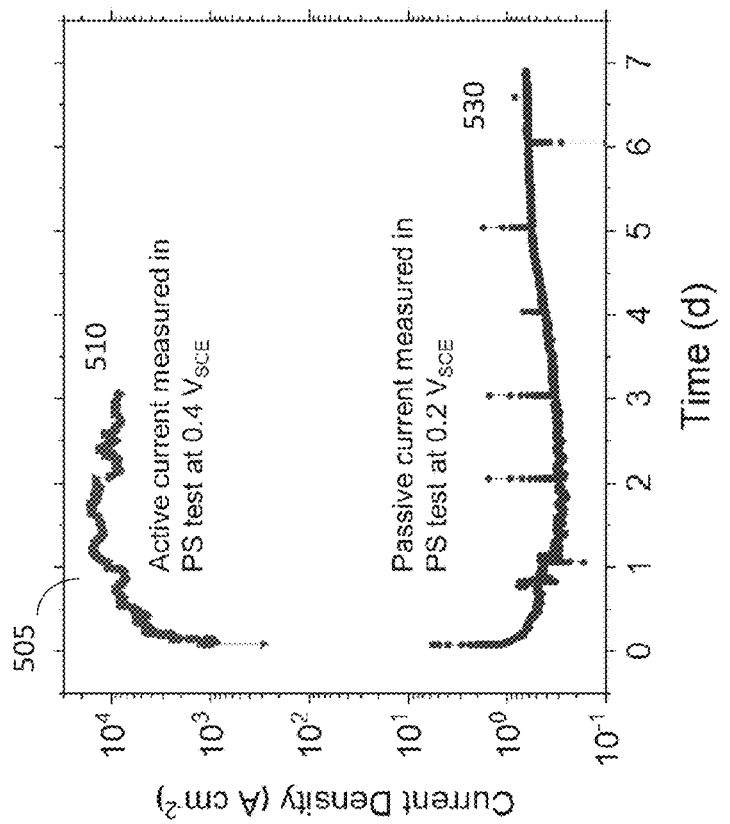
FIG. 7A is an example of the plotted currents measured in separate potentiostatic tests at 200 mV and 400 mV for attaining steady currents, in accordance with features of the present invention.
Figure 8A:
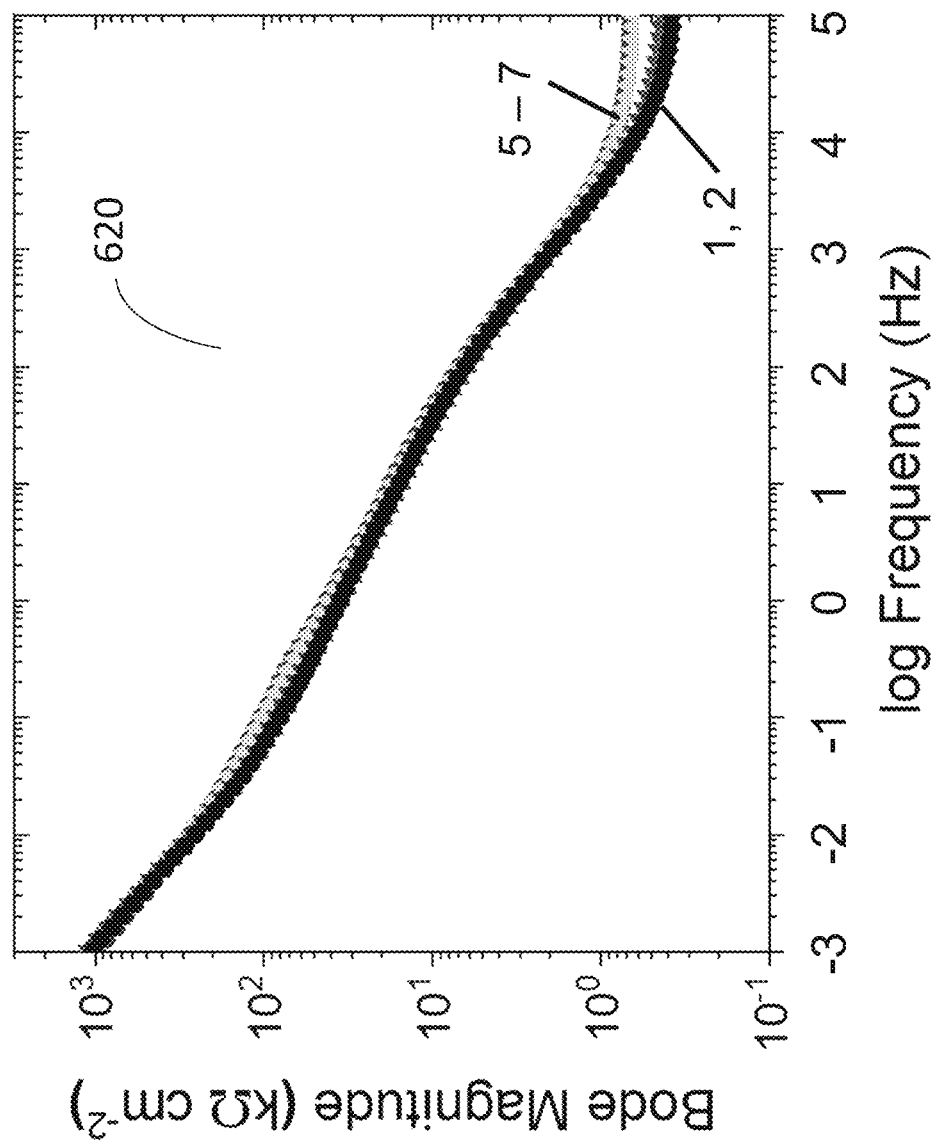
FIG. 8A depicts EIS results in a Bode magnitude plot, in accordance with features of the present invention.
Figure 8B:
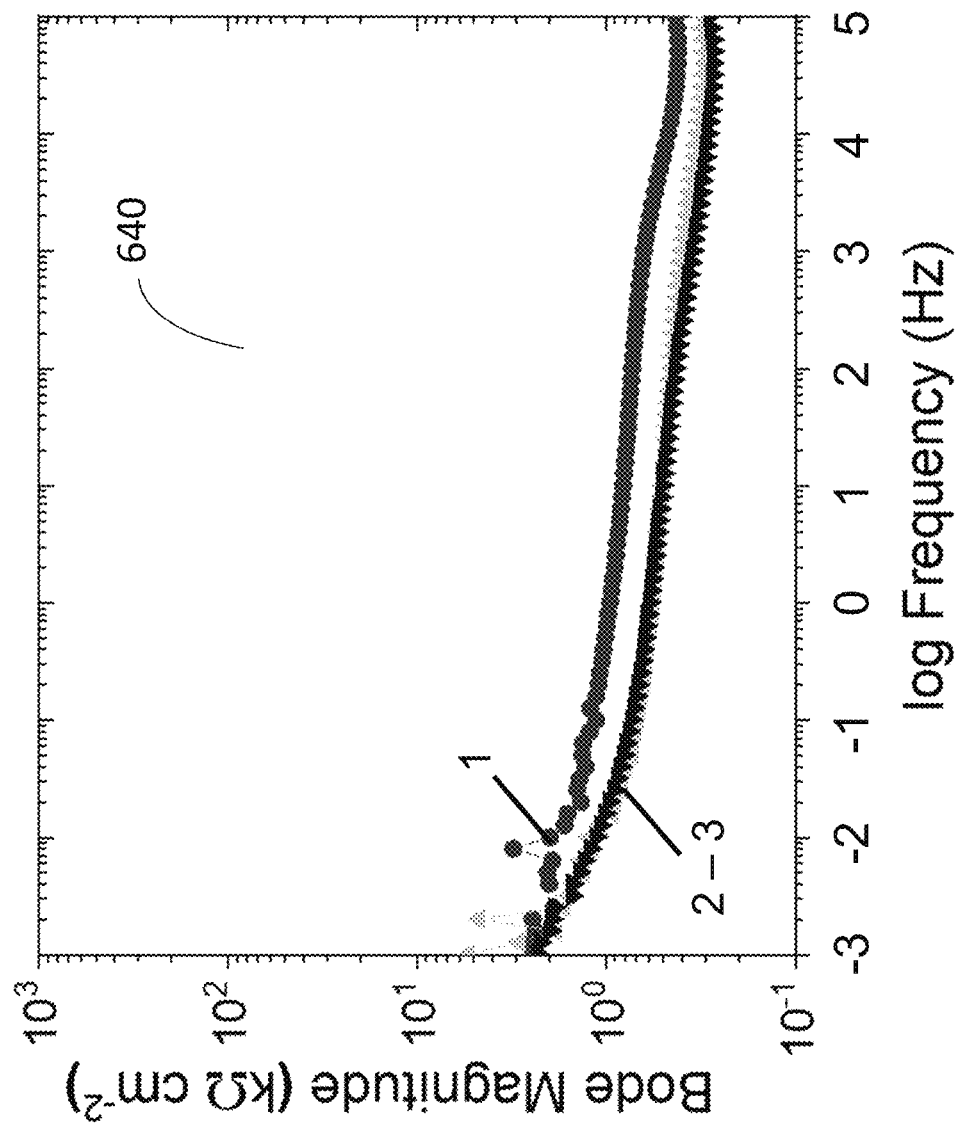
FIG. 8B is another Bode magnitude plot, in accordance with features of the present invention.
Figure 8C:
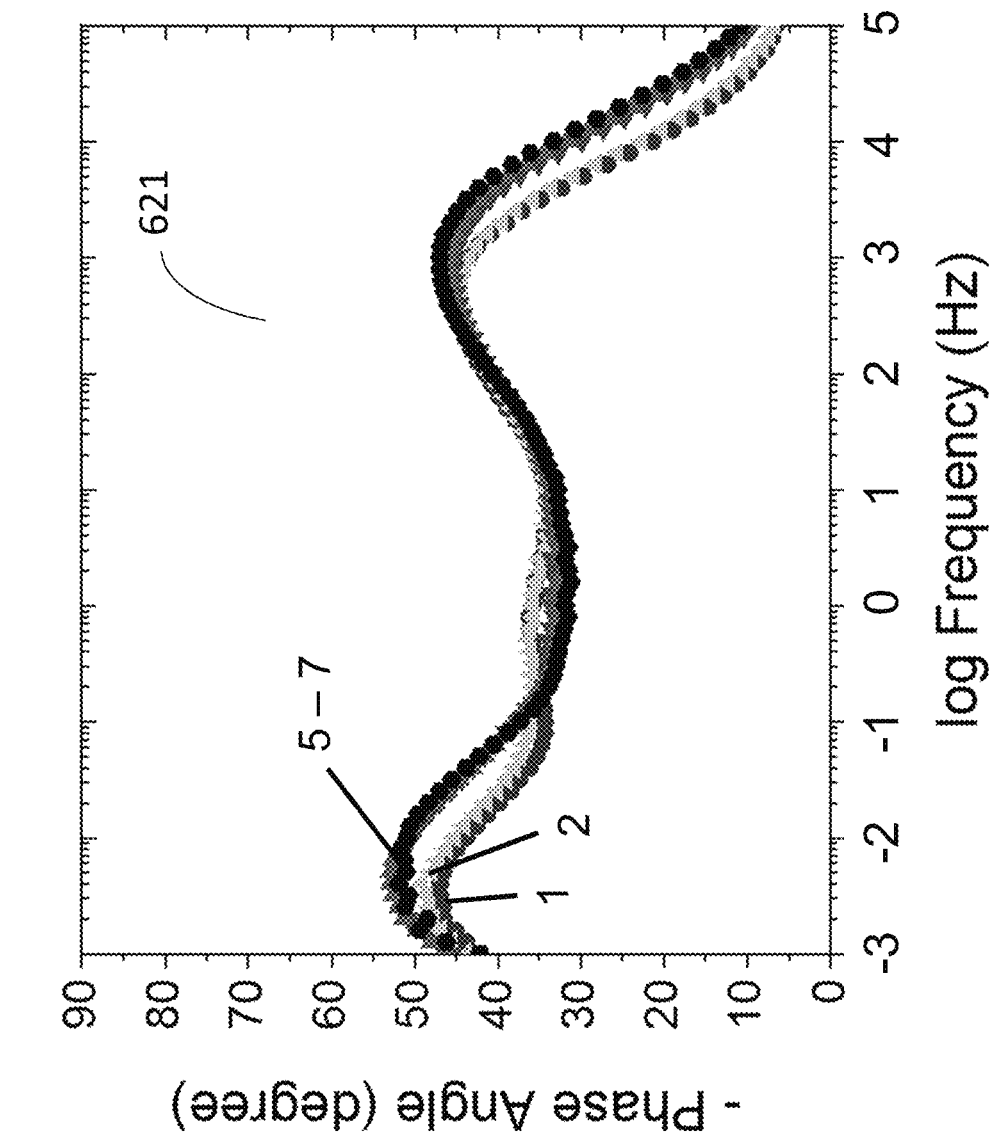
FIG. 8C depicts EIS results in a Bode phase angle plot, in accordance with features of the present invention.
Figure 8D:
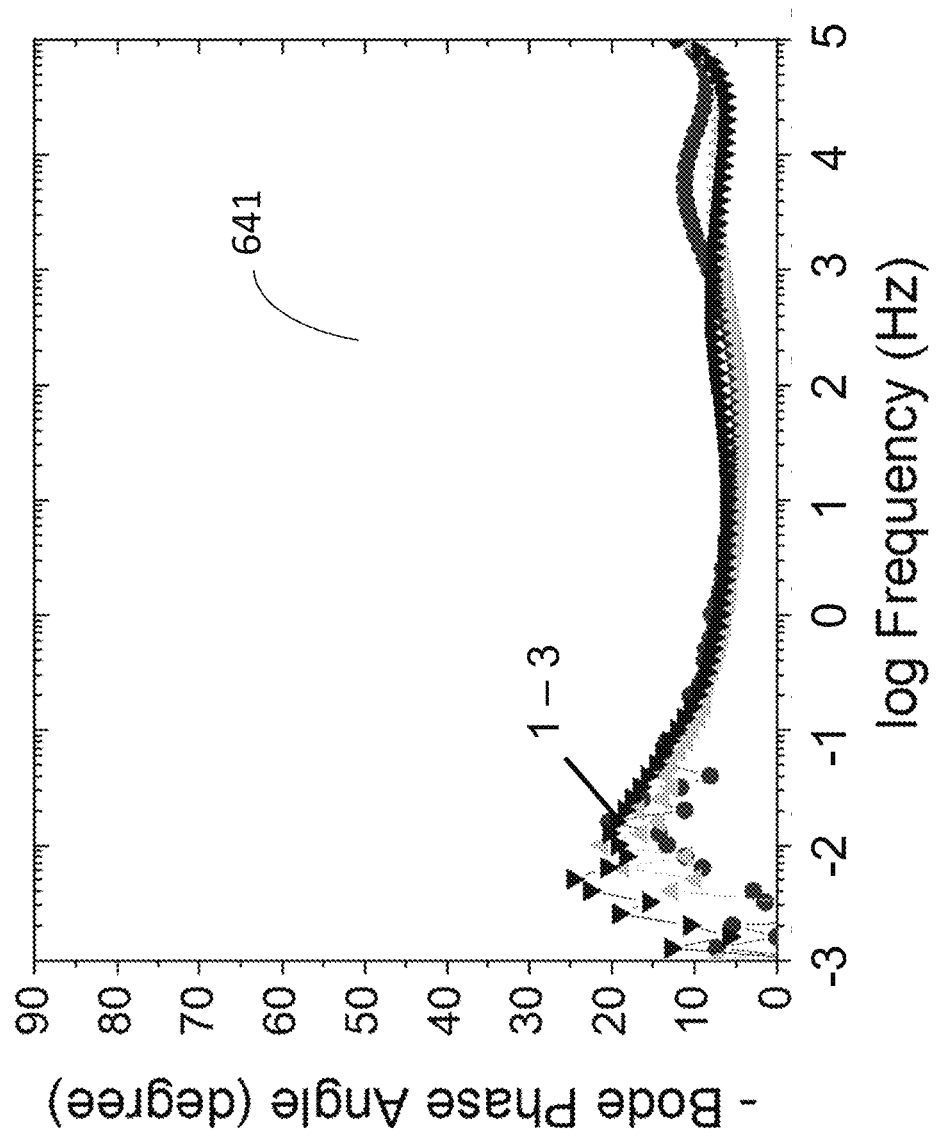
FIG. 8D is another Bode phase angle plot, in accordance with features of the present invention.

The invention shows how corrosion may be localized and phase-specific. FIG. 7 depicts an example of how the EIS and potentiostatic tests are used in conjunction with each other to determine if a steady current is attained. FIG. 7A depicts current profiles for potentiostatic tests 505 performed at 0.2 $V_{SCE}$ and 0.4 $V_{SCE}$ in a solution with a 0.01M NaCl concentration at pH 3 and at room temperature. Those steady rates are compared with potentiodynamic scans 515 in FIG. 7B. The shapes of the current profiles and the constant currents that are achieved in potentiostatic holds at different voltages 355 (In FIG. 5) indicate whether active (curve 510 in FIG. 7A) or passive corrosion (curve 530) occurred. They provide additional insights to the corrosion process. For example, the random spikes in the current profile (curve 530), indicates the occurrence of metastable pitting. In contrast, the periodic current spikes 510 are instrumental artifacts from the electrochemical impedance spectroscopy scans run daily during the potentiostatic test. If the current profile reveals a sudden increase, then that may indicate a passive layer failed or could not be sustained by the underlying alloy phase during the potentiostatic test.

A stable passive current (530) is attained in the PS test at 0.2 $V_{SCE}$ and stable active current (510) is attained in the PS test at 0.4 $V_{SCE}$. The stable passive current (530) measured in the PS test at 0.2 $V_{SCE}$ and stable active current (505) measured in the PS test at 0.4 V are shown as small square symbols and compared with the potentiodynamic scan (530). The passive current attained in the PS test at 0.2 $V_{SCE}$ is about 10-times lower than the current measured in the PD at 0.2 $V_{SCE}$, but the active current in the PS test at 0.4 $V_{SCE}$ is about 100-time higher than the current measured in the PD at 0.2 $V_{SCE}$. This is because the high scan rate used in potentiodynamic scans excludes effects of the kinetically slow passivation occurring at 0.2$V_{SCE}$ and transpassive corrosion occurring at 0.4 $V_{SCE}$. Those effects dominate the responses in the potentiostatic tests and are quantified by this method.

The EIS graph 505 is a combination of sequential EIS analyses performed during potentiostatic tests. It depicts the current density over time in tests conducted at 0.4 $V_{SCE}$ (510) and 0.2 $V_{SCE}$ (530). The decreases in current density with time in the profiles of the 520, 530, and 540 curves indicate stabilization by formation of passive layers, whereas the increase in the 510 curve indicates active corrosion. The stable current density 530 attained represents the passive current for the stabilized surface and that attained in the 510 curve represents the active current expected to be maintained until the material is completely corroded.

Plot 515 compares the passive current densities measured for the stabilized surfaces in the potentiostatic tests (squares) from graph 505 with the current densities measured for the bare surface during the potentiodynamic scan. This shows the degree of stabilization by the passive layers decreasing at increasing applied potentials until transpassive behavior occurs at a potential between about 0.3 $V_{SCE}$ (520) and 0.4$V_{SCE}$ (510).

FIG. 8 shows the evolution of the surface electrical properties with the EIS results shown in Bode magnitude and phase angle plots. Both plots indicate how the passive layers stabilize over time: the impedance magnitude at the low frequency limit increases to a maximum value and the phase angles increase and become frequency-independent over time.

Specifically, FIGS. 8A-D are examples of potentiostatic EIS results that show how surface electrical properties evolved in potentiostatic tests conducted at 0.2 $V_{SCE}$ and 0.4 $V_{SCE}$. Results are shown as Bode magnitude plots (620 in FIG. 8A and 640 in FIG. 8B) and Bode phase angle plots (621 in FIG. 8C and 641 in FIG. 8D). The numerals indicate the reaction time (in days) at which the EIS was performed.

Differences in the Bode magnitude and phase angle plots indicate different passivation layers formed in tests at different voltages. The layers formed at 0.2 $V_{SCE}$ 620 stabilized to yield high impedance and phase angle values within 5 days, while the layers formed initially at 0.4 $V_{SCE}$ 640 destabilized to yield low impedance and phase angle values within one day.

Figure 9:
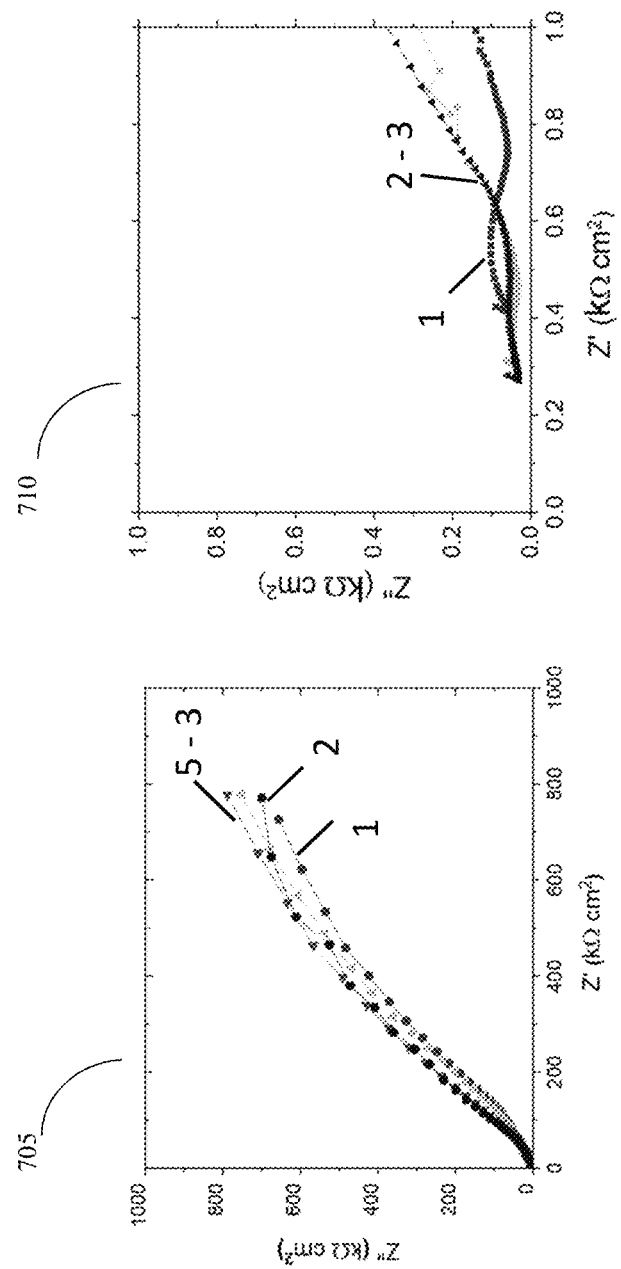
FIG. 9 depicts the potentiostatic surface properties test evolution over Nyquist plots for two different materials of interest, in accordance with features of the present invention.

FIG. 9 shows potentiostatic EIS data as Nyquist plots for passivating material. The EIS were performed after 1, 2, 3, and 5 days (graph 705). Nyquist plots (graph 710) were also generated for actively corroding material from EIS performed after 1, 2, and 3 days. The sequence of EIS Bode and Nyquist plots shows the evolution of the material surface electrical properties as the passive layers stabilize over time, as well as indicating when different layers have formed.

The EIS results are evaluated using equivalent circuit analyses, wherein the measured electrical behavior is represented by an electrical circuit having the same frequency dependency. Specifically, FIG. 10 is an example of how the EIS analysis showing the measured values and theoretical values is used to develop an equivalent circuit having the same frequency dependencies measured in the EIS analysis of the stabilized surface in the PS test at 0.2 $V_{SCE}$.

Figure 10A:
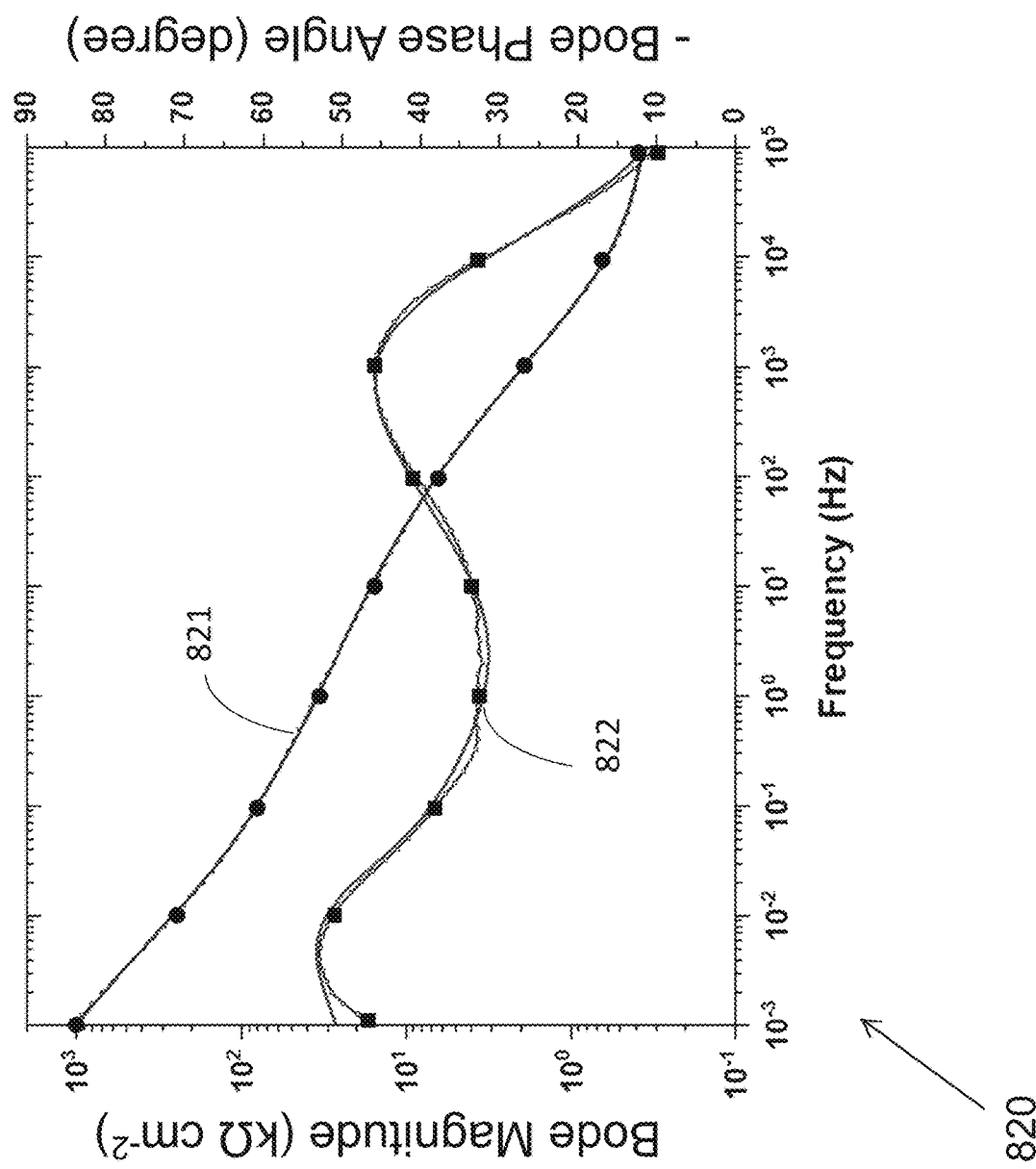
FIG. 10A a graph of EIS test values, in accordance with features of the present invention.
Figure 10B:
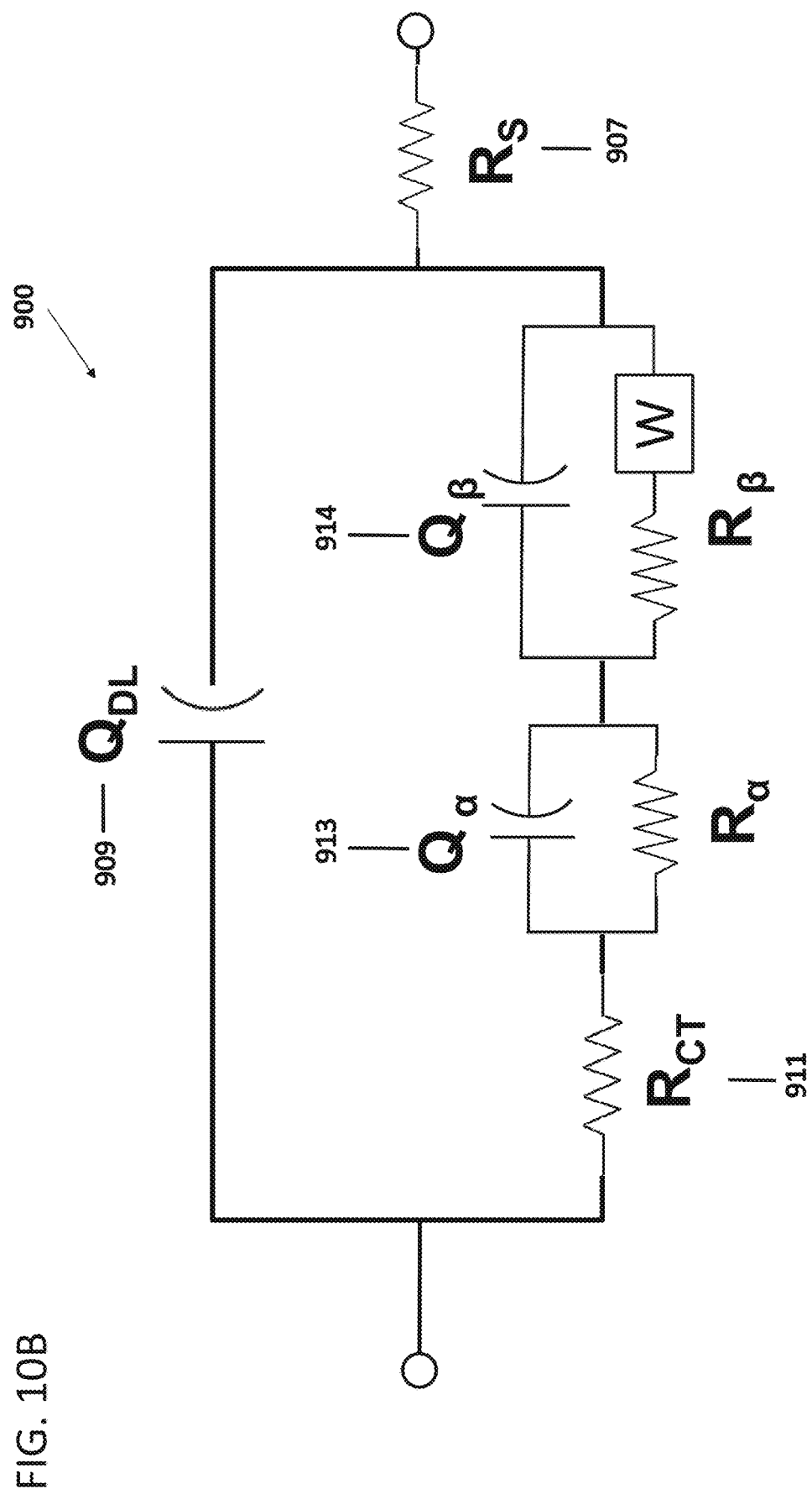
FIG. 10B is a circuit that fits the response of the EIS test values in FIG. 10A, in accordance with features of the present invention.

FIG. 10 shows the relationship between measured EIS observations (FIG. 10A) and an electrical circuit (FIG. 10B) derived from those observations. The circuit comprises elements representing the impedances provided by charge transfer resistance ($R_{ct}$), solution resistance ($R_s$), double layer capacitance ($Q_{dl}$), and an RC-sub-circuit ($Q_\alpha$ and $R_\alpha$, $Q_\beta$ and $R_\beta$) representing the passive layer. (Constant phase elements $Q_{dl}$, $Q_\alpha$, and $Q_\beta$ are used to represent imperfect capacitors, which represent imperfect passive layers.) Both the circuit configuration and values of the circuit elements are selected such that the AC frequency response of the circuit matches that measured experimentally. Furthermore, the DC current calculated to flow through the equivalent circuit at the voltage imposed in the test is compared with the stable current measured during the test to discriminate between alternative equivalent circuits. This provides confidence that the circuit is physically meaningful.

The circuit elements quantify the physical and chemical processes affecting the alloy corrosion rate in the natural system that imposes the same surface potential. The derived circuit 900 in FIG. 10B, is designed to be consistent with the EIS data (820, in FIG. 10A) collected at the end of each PS test to represent the stabilized surface. As such, the circuit verifies predictions derived from EIS and electrochemical tests.) In the plots shown as graph 820, the data are shown as squares 822 and the model results using the equivalent circuits are shown as circles 821.

The equivalent circuits for the EIS results from PS test at 0.2 $V_{SCE}$ 815 and 820 are consistent with the visual similarities in the shapes of the Bode plots, and both are different from results of EIS from the PS test performed at 0.1 $V_{SCE}$. The various capacitors, resistors, and constant phase elements (CPEs) used in the circuit (FIG. 10B) represent the physical processes affecting the materials corrosion as discussed, supra. However, different or additional circuit elements may be required to represent different surface behaviors. For example, there can be separate R and Q elements when more than one passive layer forms. (Only the alpha layer is shown in the figure.) Further, there may be an O circuit element when the working electrode is a rotating disk electrode. (O element is known as an open-finite-length-diffusion circuit.) This element may also be used when coatings or passive films are present.

A T circuit element may be included to represent a film which contains a particular amount of electroactive substance. As such, it can be used in thin layer electrochemistry scenarios. Once the electroactive materials have been consumed, they cannot be replenished. (The behavior is observed in batteries or supercapacitors, such that a T circuit element yields relevant characteristic data for those applications.)

The best fit values of the circuit components determined during the equivalent circuit analyses 815 are used to calculate the theoretical DC current at the imposed potential used in the PS test it represents. The CPEs are treated as open circuits and the Warburg components are treated as short circuits in these calculations. Close agreement (e.g., within a factor of 10 times) between the stable current measured during the PS test and the DC current calculated by the equivalent circuit provides confidence that the equivalent circuit represents the stabilized surface. Significant differences between the measured and modelled currents indicate the equivalent circuit is not appropriate.

Figure 11:
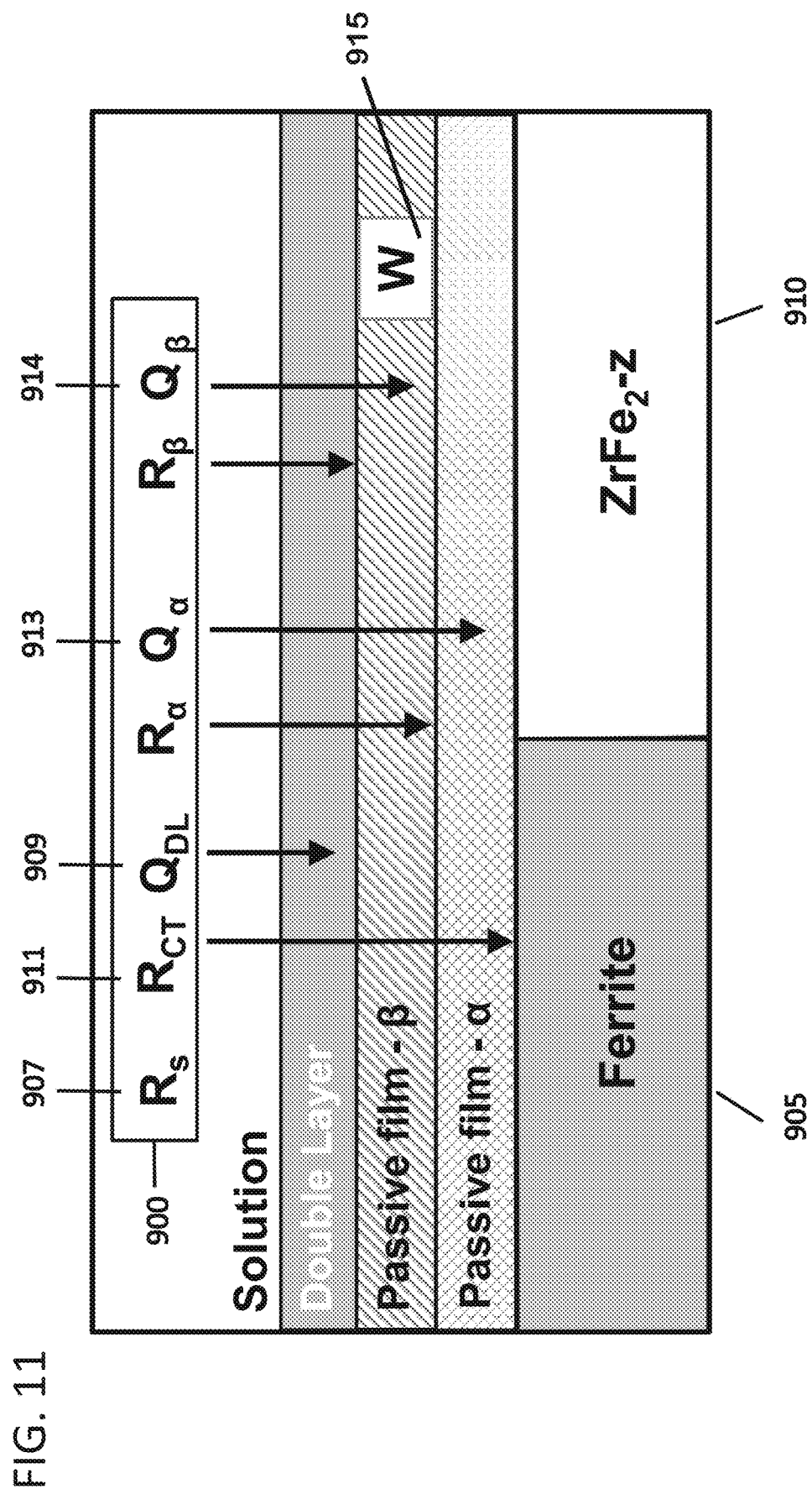
FIG. 11 depicts the physical model of surface regions (a cross section) for the stable surface that formed in the PS test at 200 mV that is consistent with the equivalent circuit shown in FIG. 10B, in accordance with features of the present invention.

FIG. 11 shows a physical model of the stabilized surface (shown as a cross section). As discussed above, the EIS analyses were performed periodically during the potentiostatic tests to quantify the electrical impedance properties of the surface layers that attenuated the alloy corrosion rate. The total impedance includes contributions from surface layers which form over the constituent phases.

A physical model may be derived that relates the elements in the equivalent circuit 900 to the surface layer structure 910. In these diagrams, the left side of the equivalent circuit in 900 corresponds with the bottom surface of the alloy in 910 and the right side of the equivalent circuit in 900 corresponds with the reference electrode in the solution above the material surface (not shown). The capacitor $Q_{DL}$ 909 represents the double layer capacitance at the solution/oxide surface layer interface and resistor $R_s$ 907 represents the resistance of solution between the double layer and the reference electrode in the solution (not shown). The resistor $R_{CT}$ 911 represents the combined charge transfer resistance of all anodic reactions occurring on all alloy surfaces. The two RC sub-circuits 913 and 914 represent the impedances provided by the passive layers that form and are referred to generically as the α and β sub-circuits.

As discussed supra, the circuit can be used to estimate current at applied voltages other than that used in the potentiostatic test from which the circuit was derived. The range of potentials for which the circuit is appropriate is related to the stability ranges of the passivating oxides represented by the α and β sub-circuits. The component values quantify the electrical properties of the stable passive surface.

In this example, the physical model shows that the Warburg element 915 in the α sub-circuit 913 represents degradation of the oxides formed over $ZrFe_2$ phases that provide the primary current path during passive corrosion. This assignment is based on SEM analyses that show Phase 1 corrodes preferentially during potentiodynamic scans (FIG. 1B). The key aspects of the equivalent model 900 and physical models 910 are (1) the oxides represented by the α and β sub-circuits form over all constituent phases of the multiphase material, and (2) the Warburg element in the α sub-circuit represents less stable regions of the oxides that form over domains of the least durable alloys.

Warburg elements can be used to represent degradation of weakly passivating layers that provide the primary current path during passive corrosion. This assignment is based on SEM analyses that shows a particular phase corrodes preferentially during potentiodynamic scans (FIG. 1A). The key aspects of the equivalent model 900 and physical models 910 are (1) the oxides represented by the α and β sub-circuits form over all constituent phases of the multiphase material, and (2) the Warburg elements represents less stable regions of the oxides that form over domains of the least durable alloys.

Scanning Electron Microscopy Detail

The scanning electron microscope (SEM) uses a focused beam of high-energy electrons to generate a variety of signals at and near the surface of solid specimens, including backscattered electrons, scattered secondary electrons, and X-rays. The signals that derive from electron-sample interactions reveal information about the sample including external morphology, chemical composition, and crystalline structure and orientation of materials which make up the sample, and a 2-dimensional image is generated that displays spatial variations in these properties. Areas with dimensions ranging from approximately 1 cm-1 micrometers can be imaged in a scanning mode using conventional SEM techniques.

The SEM allows for precise measurement of very small features and objects. Secondary electron images are sensitive to contour. Backscattered electron images (BSE) are sensitive to atomic number and can be used for rapid discrimination of phases in multiphase samples. Analysis of the X-rays that are generated when the incident and scattered electrons interact with the specimen provide compositional information.

In the claimed method, SEM analyses with associated energy-dispersive X-ray emission spectroscopy (EDS) are used to identify phases based on qualitative chemical analysis and electron backscattering efficiency.

Application of Faraday's Law

The steady-state corrosion rate calculated with Faraday's law relates the mass corrosion rate to the current density and alloy composition based on the number of electrons consumed during the anodic corrosion reactions as $$\text{Rate} = \frac{i_{corr} W}{F}$$

where $i_{corr}$ is the corrosion density, W is the equivalent weight of the alloy, and F is Faraday's constant (96,485 coulomb $mol^{-1}$). The equivalent weight of an alloy is a weighted average of values M/z for each of the major alloying elements in the alloy calculated as $$\frac{1}{W} = \frac{1}{\sum_j \frac{M(j)f(j)}{z(j)}}$$

where M(j) is the atomic weight of component j, f(j) is the mass fraction of component j in the material, and z(j) is the number of electron equivalents per mole of oxidized component j.

Waste Forms

Example

Waste forms need to be designed to be corrosion resistant when contacted by the range of seepage water compositions likely to occur in a breached waste package throughout the regulated service life of a disposal facility. The chemistries of those seepage waters will be affected by container corrosion products, radiolysis, and the range of corrosion products generated during the degradation of backfill materials, neighboring waste forms, and the waste form itself. In the US, generic disposal systems constructed in granitic, argillite, and salt formations must be evaluated for the possible co-disposal of glass, glass/ceramic, and metal waste forms with directly-disposed spent fuel. This requires that the degradation behaviors of waste forms in a wide range of possible seepage water compositions be considered during the design of the waste forms and other EBS components.

The phases formed in an alloy waste form depend on the compositions and relative amounts of cladding, fuel wastes, and added trim metals used to produce it. Steel cladding dominates most waste streams generated during the processing of fast reactor fuels. The predominant phases present in the waste forms will be Fe-based intermetallics and solid solutions. Zirconium-based cladding is used for commercial fuel and various Zr—Cr based systems forming Zr intermetallics and solid solutions are being evaluated as possible waste forms.

Stainless steel-based waste forms were developed in the 1990s to immobilize high-level radioactive wastes from the electrometallurgical treatment of used sodium-bonded nuclear fuel. These metal waste forms were produced by alloying residual metallic fuel wastes and steel cladding hulls recovered from the electrorefiner with small amounts of trim metals. A multiphase alloy resulted, comprised of physically, chemically, and radiologically durable intermetallic and solid solution phases that host radionuclides.

Most of the current inventory of used fast reactor fuel is in AISI Type 316L stainless steel cladding but future fuels may be clad in HT9-like stainless steel. The alloy waste forms made with Type 316L steel are being used as benchmarks for the metal waste forms being developed for HT9-clad fuels by adding trim Cr and Ni to attain overall waste form compositions similar to those made with Type 316L cladding.

Therefore, the impact of the different steel-based cladding materials on the waste form composition will be due primarily to the amounts of passivating constituents added as trim.

The material may comprise a metal or alloy, including homogenous or multiphase alloys and alloy-oxide composites, or any combination thereof. Further, the material may comprise any conductive material which corrodes by a mechanism involving electron transfer.

The materials' microstructure and phase composition are characterized by scanning electron microscopy with x-ray emission spectroscopy to identify phases and alteration products.

The overall dependencies on the environmental conditions measured using multi-phase materials represent the dependence of whichever constituent phase provides the dominant anodic corrosion current at the potential of interest. While this makes it possible to model the overall alloy degradation, Tc-99 and other radionuclides are not uniformly distributed between the constituent phases. The dependence of the release rate of Tc-99 (and other radionuclides) on the potential will probably have a different functional form than does the dependence of the overall corrosion current. Therefore, measuring the Tc-99 released to solution during electrochemical experiments is as important as measuring the anodic corrosion current.

The sensitivity of the Tc-99 release to the electrochemical potential must be determined as an empirical parameter. Whereas the anodic current represents the sum of several oxidation reactions that lead to waste form degradation, the cathodic current represents the sum of many cathodic reactions taking place on the surfaces of the constituent phases that are coupled with the anodic reactions. The key processes controlling the cathodic current are electron transfer (reduction) at the charge transfer surface and mass transport of the oxidizing agents to the charge transfer surfaces. Parameters to be used in the model to take into account the partial anodic and cathodic processes are obtained from experimental data that provide the overall response for multiple species and reactions.

Preferably, only the contributions of reactants that are tracked in performance assessment calculations for a disposal facility re considered explicitly, while the effects of minor reactions should be taken into account implicitly through the measured values of the model parameters. These are represented by the standard solutions (and relevant variations) that bracket possible environments in the disposal system. Specific experiments focus on the responses to the combined effects of pH, dissolved oxygen, and dissolved Cl— in several solutions to determine analytical expressions to model those variables. This approach is consistent with environmental variables that are tracked in performance assessment calculations.

A representative alloy waste (RAW) form is analyzed by a potentiodynamic scan to measure the propensity for corrosion in the solution of interest. The solution in this example is 0.01 M NaCl adjusted to a pH of 3 at room temperature. The scan indicates the corrosive potential, the range in which it is passivated, and the potential at which it becomes transpassive. An SEM scan is performed to show the preferential corrosion of Phase 1 in Fe—Ni—Zr.

Laboratory-scale ingots of the exemplary waste forms materials were produced by melting mixtures of AISI Type 316L stainless steel chips with Zr wire and metal powders in an ultra-pure argon atmosphere at about 1650° C. and 1600° C., respectively, for about 2 h. Polished cross sections of each material were prepared to characterize the microstructure and measure the compositions of the constituent phases by using an SEM (Hitachi S-3000N) with associated energy-dispersive X-ray emission spectroscopy (EDS; Thermo-Noran System Six or Thermo Scientific UltraDry). The consistencies of the microstructures and phase compositions in each ingot were assessed by areal analyses of broad cross sections, spot analyses of individual phases at locations throughout the cross-sections, and line profiles spanning phase domains and phase boundaries.

Specimens used in the electrochemical tests were cut from each ingot as parallelepipeds with dimensions of about $1\times2\times15$ mm$^3$ by using a low-speed saw with a diamond wafering blade and water lubrication. Each test specimen was first fixed in acrylic resin and a copper wire was attached to the back end of the specimen using conductive epoxy. The assembled specimen and lead wire was then core-drilled and embedded in epoxy to produce a rod-like electrode with one end of the specimen exposed at the front end of the electrode and the wire protruding from the back end. Each electrode was made to be about 6 mm in diameter and 6 cm long, which is long enough for use in the microcell reactor during the electrochemical tests but short enough to fit into the sample holder of the SEM for microscopic characterization.

Several electrodes were made with specimens cut from each material for use in electrochemical tests and care was taken to polish all electrodes to a similar final surface finish. The approximately $1\times2$ mm$^2$ specimen surface exposed at the face of each electrode was polished to a final 1-μm finish with a series of abrasive papers and water lubrication followed by a final polish with a silica slurry. The face of each polished electrode was characterized with SEM to ensure no gaps had formed between the specimen and acrylic resin during production of the electrode. The detailed microstructures in several areas on the electrode surface were documented for later comparisons with analyses to be conducted after the tests were completed to determine which phases had corroded. Regions with phases having recognizable shapes or other unique features that served as fiducial markers were selected to help locate the same areas after corrosion. The exposed geometric surface area of the RAW material in each electrode was measured by using the SEM to normalize the currents measured during the electrochemical tests as current densities for direct comparisons. The normalized current densities can also be scaled to represent full-size waste forms.

All electrochemical tests were conducted at room temperature in about 15 mL of an air-saturated acidic NaCl solution (0.1 mmolal $H_2SO_4$+10 mmolal NaCl adjusted to pH 4) in a 20-mL glass microcell (Princeton Applied Research). These conditions are used to represent seepage water that has interacted with bentonite backfill and then been acidified by corrosion of the waste package and radiolysis to about pH 4. Electrodes made from specimens of two different materials (RAW-2 and RAW-4) were used as the working electrodes in separate tests conducted in a cell with a KCl-saturated calomel reference electrode (SCE) and graphite counter electrode. Unless stated otherwise, voltages are reported relative to the SCE as $V_{SCE}$.

Tests were performed using a computer-controlled potentiostat, such as VersaSTAT 4 (Princeton Applied Research, Oak Ridge Tenn.) programmed with the protocols for each method, including scan ranges and rates, applied potentials, and hold times. Commercial software such as Versa Studio (Princeton Applied Research) was used to analyze the data and generate standard plots. Tests were conducted using parameter values that exceed the anticipated ranges for disposal conditions to determine analytical expressions for the effects of environmental variables that can be used in the degradation model. For example, solution redox potentials higher than 0.6 $V_{SCE}$ may not be physically achievable in disposal systems, but tests at even higher potentials are being used to augment the mechanistic understanding of the degradation process and reliably quantify the dependence of the corrosion rate on the environmental redox, including strongly reducing and strongly oxidizing conditions that could occur in localized microenvironments.

Responses of small electrodes are sensitive to differences in the relative amounts of constituent phases that occur on the mm-scale due to cutting different specimens from the ingot and minor differences on the μm-scale due to polishing the specimen surface for reuse of the electrode in several tests. Small but significant differences in test responses highlight the effects of the relative amounts of constituent phases exposed at the face of the electrode on the corrosion behavior and the contributions of phase and grain boundaries.

Series of PS tests were conducted at applied voltages selected to represent the cathodic, active, passive, and transpassive regions for each material observed in the PD scans to measure the evolution of the currents until they attained a constant rate representing the steady corrosion of a passivated surface or active corrosion. The voltages applied in the PS tests were used to represent the corrosion potentials that would be attained at the alloy surface when contacted by seepage water having a chemical composition with that redox. Therefore, the currents measured in a PS test at a particular imposed potential represent the corrosion currents that would be attained when the material is contacted by a solution with that value. Although the corrosion rates of the stabilized surfaces that form at fixed voltages representing the range of solution redox (Eh) values are of primary interest for modeling waste form performance, the electrical properties of those surfaces and the capacity of the waste form to maintain them provide confidence in their long-term stability. The use of a potentiostat ensures the potential will remain constant throughout the test to quantify the dependence of the corrosion rate on the Eh, while simultaneously measuring the dependencies on the solution composition and temperature.

The potential at which the cathodic and anodic currents are equal and the measured current density is zero is traditionally referred to as the corrosion potential ($E_{CORR}$). Electrodes made from specimens of two different materials (RAW2 and RAW4) were used as the working electrodes in separate tests conducted in a cell with a KCl-saturated calomel reference electrode (SCE) and graphite counter electrode. The gross compositions in mass percent of the different materials were as follows:

each PS test. This step as was done to provide a consistent surface at the beginning of each PS test, even though it was not fully equilibrated with the solution.

EIS analyses were performed prior to the PS tests to characterize the OC film and then characterize the initial response of the surface to the voltage applied during the PS test. All EIS analyses were conducted with scans from 10 kHz to 1 mHz with the electrode held at the PS voltage and required about 2 hours to complete. The PS tests were conducted as sequential loops of PS hold and EIS analyses to assess the surface corrosion behavior as it stabilized at different potentials.

Potentiostatic tests measure the corrosion rates under a range of potentials to represent solution redox (Eh) values that could occur in a disposal system during and after the generation of passivating or leached layers on constituent phases. Tests are conducted under different conditions to derive equations for the corrosion rate dependence on alloy composition and environmental variables. (Such variables include solution Eh, pH, chloride concentration, etc.). An equivalent circuit having the same AC frequency dependency as measured in the EIS of the stabilized surface is derived. The direct currents calculated from that circuit at the same voltages can be compared with the stable currents measured in the potentiostatic tests to verify that the circuits represent the stabilized surfaces.

The tests are designed to span a range of possible conditions which could occur in geological disposal facilities. The environmental changes occurring in each facility will be due to several differing factors which cause the natural Eh (redox potential) to rise or fall. The method of this invention characterizes the corrosion behavior of a material in most of the possible environments, both present and future, giving a better idea of the long-term performance likely to be observed in each environment.

Tests were being conducted using several representative alloyed waste form (RAW) materials for steel-clad fuel that provide a range of waste form compositions. Also used were several electrolytes representing the range of chemical conditions that could occur within breached waste packages in various disposal systems due to the effects of radiolysis and corrosion of other EBS components and waste forms.

A potentiostat is used to directly apply surface potentials on specimens that represent the range of solution redox (Eh) conditions that could occur in seepage waters. Potentiostatic (PS) tests are conducted at several fixed voltages to measure the evolution of the corrosion current as the waste form surface corrodes or stabilizes over several days. Voltages were selected to characterize alloy corrosion under conditions expect to lead to cathodic, active, passive, or transpassive behaviors based on the results of a potentiodynamic

|  | Fe | Cr | Ni | Mo | Mn | Si | Zr | U | Tc | Ru | Pd | Rh | Nb |
|---|---|---|---|---|---|---|---|---|---|---|---|---|---|
| RAW2 | 39 | 11 | 7.4 | 4.6 | 1.0 | 0.3 | 9.7 | 2.4 | 3.7 | 11.3 | 7.6 | 2.0 | 0 |
| RAW4 | 51 | 14 | 9.7 | 1.7 | 1.2 | 0.4 | 15 | 2 | 1 | 1 | 1 | 1 | 1 |

Scoping tests indicated neither RAW-2 nor RAW-4 completely stabilized in the acidic NaCl test solution due to formation of slowly stabilizing passive films that we refer to as open circuit (OC) films. Therefore, the electrode was immersed in the test solution and cathodically cleaned at about −0.3 $V_{SCE}$ for a few minutes and then left at open circuit (i.e., with no applied voltage) for about eight hours to equilibrate with the solution and form the OC film prior to (PD) scan conducted in the same solution to show the propensity of the bare surface for passivation.

A series of PS tests quantify the effect of the solution chemical and redox conditions on the anodic current as either active corrosion continues or the surface equilibrates under the applied conditions and stable passivating layers form. The current is monitored continuously during the PS hold and the electrical properties of the surface are measured daily by using electrochemical impedance spectroscopy (EIS). The cycle of PS hold-EIS is repeated to assess the stability of the electrode surface in the solution based on the capacities of the alloy phases that constitute the waste form to maintain effective passive layers.

The electrochemical responses are correlated with changes in the microstructure of the electrode surface based on examinations made before and after the tests by using a scanning electron microscope (SEM) and with the measured concentrations of radionuclides (or surrogates) and host phase constituents that are released into the solution during the PS test to identify the reactive phases. The combined results are used to derive equivalent circuit and physical models of the waste form degradation behavior.

In summary, the invention provides a method for predicting corrosion rates of a material during service conditions. Service conditions are defined by particular solution composition and redox potential.

The invented method comprises creating the service conditions, determining the redox potential of the service conditions, exposing the material to the service conditions, and maintaining the redox potential of the service conditions by using a potentiostat for a time sufficient to evaluate changes of the exposed material. Subsequent solutions analysis identifies elements of each phase and characterizes element distribution of each phase. Solutions analysis identifies elements of each phase and characterizes element distribution of each phase.

Dependencies of the redox reaction on environmental variables and parameter values are measured empirically for several alloyed materials to represent a range of metallic waste form compositions under conditions which span a range of environmental conditions which occur in a geological disposal system. Separate tests are conducted, measuring the stable current density, surface properties, and radionuclide release into a solution at several potentials. The tests are conducted in several solutions determining empirical dependencies on solution properties; wherein the properties include pH and Cl concentrations, at several imposed surface potentials, and at several temperatures.

The electrochemical reactions resulting from the material contacting solution(s) representing the service conditions are modeled using electrode kinetics theory. Through the use of potentiostatic scans, potentiostatic hold tests and electrochemical impedance spectroscopy, key variables affecting corrosion rates of a material are identified. The derived degradation model is therefore based on analytical functions that take into account the effects of environmental variables on the electrochemical oxidation reactions with a multiphase alloy during active and passive corrosion, the attenuating effect of surface passivation, and the release of oxidized radionuclides into the solution.

The electrical properties of a surface are characterized periodically using EIS while the material is maintained at a polarized potential determined by the potentiostatic tests. Potentiostatic tests measure the corrosion rates of a material stabilized at a voltage representing a particular solution redox. EIS is performed simultaneously with the potentiostatic hold tests and periodically to assess passivation of the surface. EIS measures the electrical stability of the material surface, characterizing the interface between the material and the solution. The electrochemical processes are performed at a constant voltage in different chemical environments that are held constant during each test. Tests in environments that differ by a single variable are used to derive an analytical equation relating the corrosion rate to key environmental variables.

The aforementioned variables are incorporated into analytical models quantifying the effects of environmental variables that can be used to calculate long-term corrosion performance in evolving conditions. For example, the invention relates electrochemical corrosion behaviors to the release rates of radionuclides of a waste form. This allows for the formulation of metal waste forms that are durable over the wide range of redox and chemical conditions that could occur in a geologic repository.

An equivalent circuit quantifying passivation properties was also developed to add confidence to long-term predictions, wherein the circuit is based on the aforementioned parameterization of the electrochemical processes. The physical model consistent with the measured structural and electrical behaviors is based on electrochemical principles applied to a multi-phase waste form.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for predicting corrosion rates of a material under a plurality of service conditions, the method comprising:
   a) determining a first phase composition of the material prior to corrosion;
   b) exposing the material to a chemical environment representing a first service condition, wherein the environment defines a redox value;
   c) applying a series of fixed electrical potentials to the exposed material to represent the redox value;
   d) identifying ranges of the applied potential that correspond to different corrosion behaviors of the material;
   e) quantifying current and surface electrical properties during corrosion; and
   f) determining a second phase composition of the material after corrosion in a second service condition.

2. The method as recited in claim 1, wherein the steps of determining the initial phase composition and the second phase composition of the material comprises examining the material with scanning electron microscopy and associated energy-dispersive X-ray emission spectroscopy.

3. The method as recited in claim 1, wherein the step of identifying ranges of the applied potential comprises examining the corroded material with scanning electron microscopy.

4. The method of claim 1 wherein the service conditions are chemical parameters selected from the group consisting of pH, solution concentrations of predetermined moieties, radiolytic products, temperature, and combinations thereof.

5. The method as recited in claim 1 the step of selecting electrical potentials comprises conducting an initial potentiodynamic scan of the material in the chemical environment.

6. The method of claim 5, wherein the applied potential is selected to characterize a material corrosion behavior selected from the group consisting of cathodic corrosion, active corrosion, passive corrosion, or transpassive corrosion.

7. The method as recited in claim 1 wherein the step of quantifying the corrosion comprises applying potentiostatic tests to the material at a plurality of applied potentials.

8. The method as recited in claim 7 wherein electrical impedance spectroscopy is performed during and after the potentiostatic tests to measure the material's electrical properties selected from the group consisting of current, impedance, passivation, and combinations thereof.

9. The method as recited in claim 7 wherein the potentiostatic tests are conducted at several fixed voltages to measure evolution of corrosion current as the material corrodes or stabilizes over time under fixed chemical conditions.

* * * * *